US011536602B2

(12) United States Patent
Imagawa et al.

(10) Patent No.: US 11,536,602 B2
(45) Date of Patent: Dec. 27, 2022

(54) LOAD METER AND LOAD MEASUREMENT METHOD

(71) Applicant: Panasonic Intellectual Property Management Co., Ltd., Osaka (JP)

(72) Inventors: Taro Imagawa, Osaka (JP); Akihiro Noda, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 939 days.

(21) Appl. No.: 16/372,499

(22) Filed: Apr. 2, 2019

(65) Prior Publication Data

US 2019/0226904 A1    Jul. 25, 2019

Related U.S. Application Data

(63) Continuation of application No. PCT/JP2018/001120, filed on Jan. 17, 2018.

(30) Foreign Application Priority Data

Feb. 28, 2017 (JP) .............................. JP2017-036228
Oct. 30, 2017 (JP) .............................. JP2017-209445

(51) Int. Cl.
  *G01G 19/03*   (2006.01)
  *G01G 9/00*    (2006.01)
  *G01G 23/01*   (2006.01)

(52) U.S. Cl.
  CPC .............. *G01G 19/03* (2013.01); *G01G 9/00* (2013.01); *G01G 23/01* (2013.01)

(58) Field of Classification Search
  CPC ........ G01G 9/00; G01G 19/02; G01G 19/021; G01G 19/022; G01G 19/024; G01G 19/03; G01G 23/01
  See application file for complete search history.

(56) References Cited

U.S. PATENT DOCUMENTS 1,689,978 A * 10/1928 Swartley ................ G01G 19/08
                                                    177/137
3,428,139 A *  2/1969 Nolan ..................... G01S 15/88
                                                    177/21 OR
(Continued)

FOREIGN PATENT DOCUMENTS

EP       1927827 A2      6/2008
JP       8-293090        11/1996
(Continued)

OTHER PUBLICATIONS

The Extended European Search Report dated Mar. 3, 2020 for the related European Patent Application No. 18760961.5.
(Continued)

*Primary Examiner* — Randy W Gibson
(74) *Attorney, Agent, or Firm* — McDermott Will & Emery LLP

(57) ABSTRACT

A load meter includes a detector, a storage unit, and a load calculator. The detector detects, by using a captured image obtained by capturing a road and a vehicle present on the road, a displacement amount in the captured image, the displacement amount corresponding to displacement caused on the road by application of a load of the vehicle. The storage unit stores information indicating a relation between the load and the displacement amount. The load calculator calculates the load based on the displacement amount and the information.

18 Claims, 16 Drawing Sheets

(56) References Cited

U.S. PATENT DOCUMENTS

| | | | | |
|---|---|---|---|---|
| 3,480,095 | A * | 11/1969 | Tuchman | G01G 19/08 177/137 |
| 4,756,374 | A * | 7/1988 | Bailey | G01G 7/06 177/128 |
| 5,376,760 | A * | 12/1994 | Horsley | G01G 19/08 177/137 |
| 2007/0062289 | A1* | 3/2007 | Heyman | G01G 9/00 73/597 |
| 2008/0136676 | A1* | 6/2008 | Yano | G01G 23/005 340/666 |
| 2011/0267200 | A1* | 11/2011 | Reynolds | G01G 19/024 177/1 |
| 2016/0040984 | A1* | 2/2016 | Byrne | G06T 7/507 348/92 |
| 2017/0307360 | A1 | 10/2017 | Imai | |
| 2018/0045558 | A1* | 2/2018 | Moore | G01G 23/3721 |
| 2018/0245969 | A1* | 8/2018 | Imagawa | G01G 23/01 |
| 2019/0212223 | A1* | 7/2019 | Kusaka | G01G 19/022 |
| 2019/0226904 | A1* | 7/2019 | Imagawa | G01G 19/024 |
| 2019/0242693 | A1* | 8/2019 | Noda | G01B 11/16 |
| 2019/0339110 | A1* | 11/2019 | Kaseda | G01G 3/12 |
| 2020/0408586 | A1* | 12/2020 | Imagawa | B60W 40/13 |
| 2021/0302222 | A1* | 9/2021 | Kobayashi | G01H 1/00 |
| 2022/0170779 | A1* | 6/2022 | Takada | G01M 5/0033 |
| 2022/0178735 | A1* | 6/2022 | Nakano | G08G 1/052 |

FOREIGN PATENT DOCUMENTS

| | | |
|---|---|---|
| JP | 2005-030786 | 2/2005 |
| JP | 2009-168715 A | 7/2009 |
| JP | 2010-197249 | 9/2010 |
| JP | 2010-261825 A | 11/2010 |
| JP | 5424787 B | 2/2014 |
| JP | 2017-058177 | 3/2017 |
| WO | 2016/047093 | 3/2016 |

OTHER PUBLICATIONS

The Extended European Search Report dated Mar. 4, 2020 for the related European Patent Application No. 17832175.8.
International Search Report of PCT application No. PCT/JP2018/001120 dated Mar. 27, 2018.

* cited by examiner

| Y \ X | RANGE 1 (1 PIXEL TO 10 PIXELS) | RANGE 2 (11 PIXELS TO 20 PIXELS) | RANGE 3 (21 PIXELS TO 30 PIXELS) | .... |
|---|---|---|---|---|
| RANGE 1 (1 PIXEL TO 10 PIXELS) | 5 | 4.5 | 5 | .... |
| RANGE 2 (11 PIXELS TO 20 PIXELS) | 6 | 5 | 5 | .... |
| RANGE 3 (21 PIXELS TO 30 PIXELS) | 4 | 4 | 4 | .... |
| ⋮ | ⋮ | ⋮ | ⋮ | ⋮ |

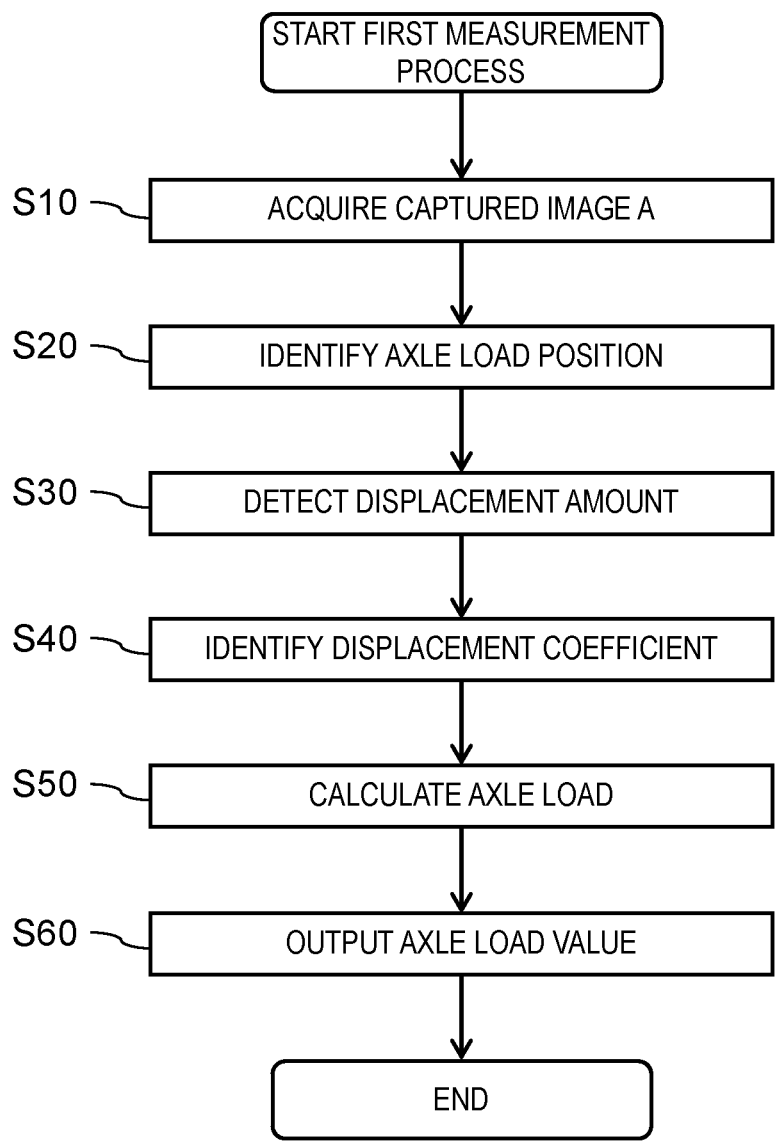

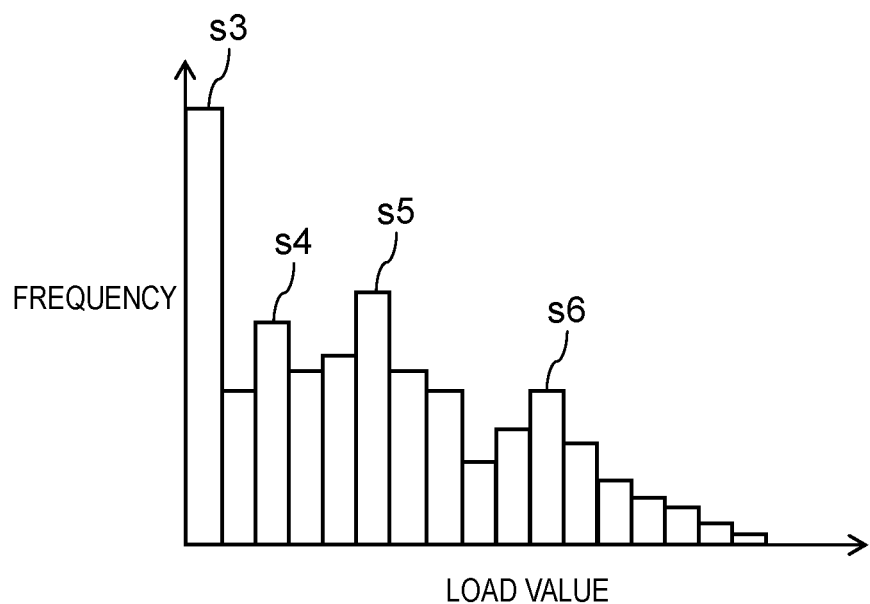

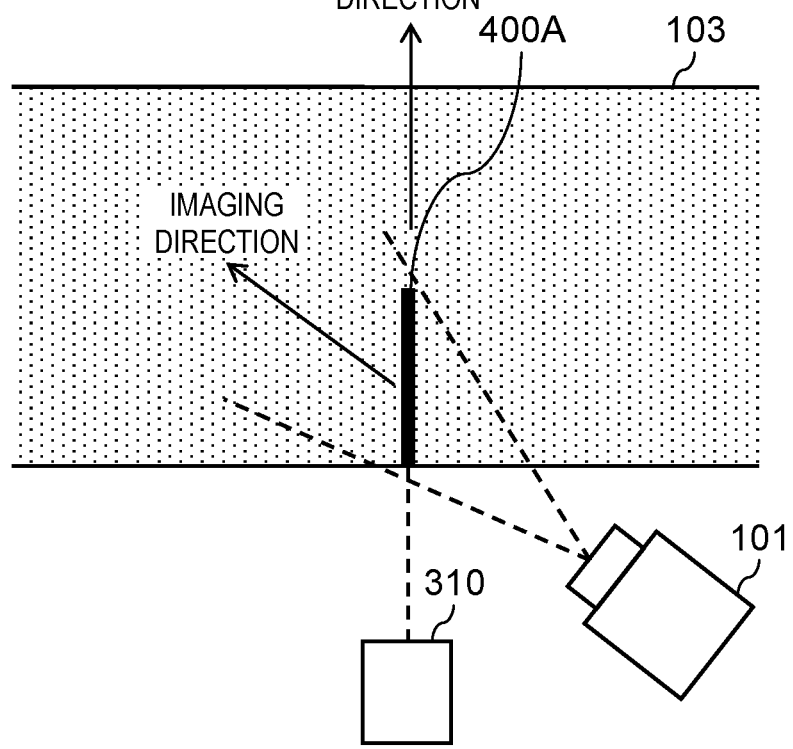

LOAD METER AND LOAD MEASUREMENT METHOD

TECHNICAL FIELD

The present disclosure relates to a load meter that measures a load of a vehicle or the like.

BACKGROUND ART

Conventionally, a load measuring device that measures a load of a vehicle or the like has been known. For example, PTL 1 discloses a load measuring device for measuring a load of a vehicle running on a road. This load measuring device measures the load of the vehicle using a load sensor embedded in the road.

CITATION LIST

Patent Literature

PTL 1: Japanese Patent No. 5424787

SUMMARY

The conventional load measuring device described above needs to embed the load sensor for measuring the load in the road. Therefore, installment or removal of the conventional load measuring device needs a certain amount of cost and labor.

In view of this, the present disclosure provides a load measuring device that can keep labor and cost for installment or removal lower than conventionally.

A load meter according to one aspect of the present disclosure includes a detector, a storage unit, and a load calculator. The detector detects, by using a captured image obtained by capturing a road and a vehicle present on the road, a displacement amount in the captured image, the displacement amount corresponding to displacement caused on the road by application of a load of the vehicle. The storage unit stores information indicating a relation between the load and the displacement amount. The load calculator calculates the load based on the displacement amount and the information.

The load measuring device according to the present disclosure can keep labor and cost for installment or removal lower than conventionally.

BRIEF DESCRIPTION OF DRAWINGS

FIG. 4A is a flowchart for describing an operation of a first measurement process.

FIG. 8C is a graph illustrating one example of a histogram of axle load values acquired in advance.

FIG. 8D is a graph illustrating one example of a histogram generated by a calibrator according to a modified example.

FIG. 14 is a view schematically illustrating a relation between a projecting direction of the patterned light and an imaging direction.

DESCRIPTION OF EMBODIMENTS

A load meter according to one aspect of an exemplary embodiment includes a detector, a storage unit, and a load calculator. The detector detects, by using a captured image obtained by capturing a road and a vehicle present on the road, a displacement amount, in the captured image, corresponding to displacement caused on the road by application of a load of the vehicle. The storage unit stores information indicating a relation between the load and the displacement amount. The load calculator calculates the load based on the displacement amount and the information.

Accordingly, the load meter can keep labor and cost for installing or removing the load meter lower than conventionally.

It is to be noted that these generic or specific aspects may be implemented by using a system, a method, an integrated circuit, a computer program, or a computer-readable recording medium such as a compact disc read only memory (CD-ROM), and may also be implemented by any combination of the system, the method, the integrated circuit, the computer program, and the recording medium.

A specific example of the load meter according to one aspect of the present disclosure will be described below. It should be noted that each of the exemplary embodiments described hereafter illustrates one preferred specific example of the present disclosure. Numerical values, shapes, materials, components, arrangement positions and connection configurations of the components, steps, processing order of the steps, and the like shown in the following exemplary embodiments are mere examples, and are not intended to limit the present disclosure. The present disclosure is limited only by the scope of the claims. Accordingly, among the components in the following exemplary embodiments, components that are not described in any of independent claims indicating the most generic concept of the present disclosure are not essential for achieving the object of the present disclosure but are described as preferable components.

First Exemplary Embodiment

As one aspect of the present disclosure, a load measuring system installed in a road on which ordinary vehicles travel will be described herein.

It is assumed herein that a calibration device is operated by being incorporated in a load meter that constitutes the load measuring system. The load meter and the calibration device according to the present disclosure will be described below with reference to the drawings.

[1-1. Configuration]

Figure 1:
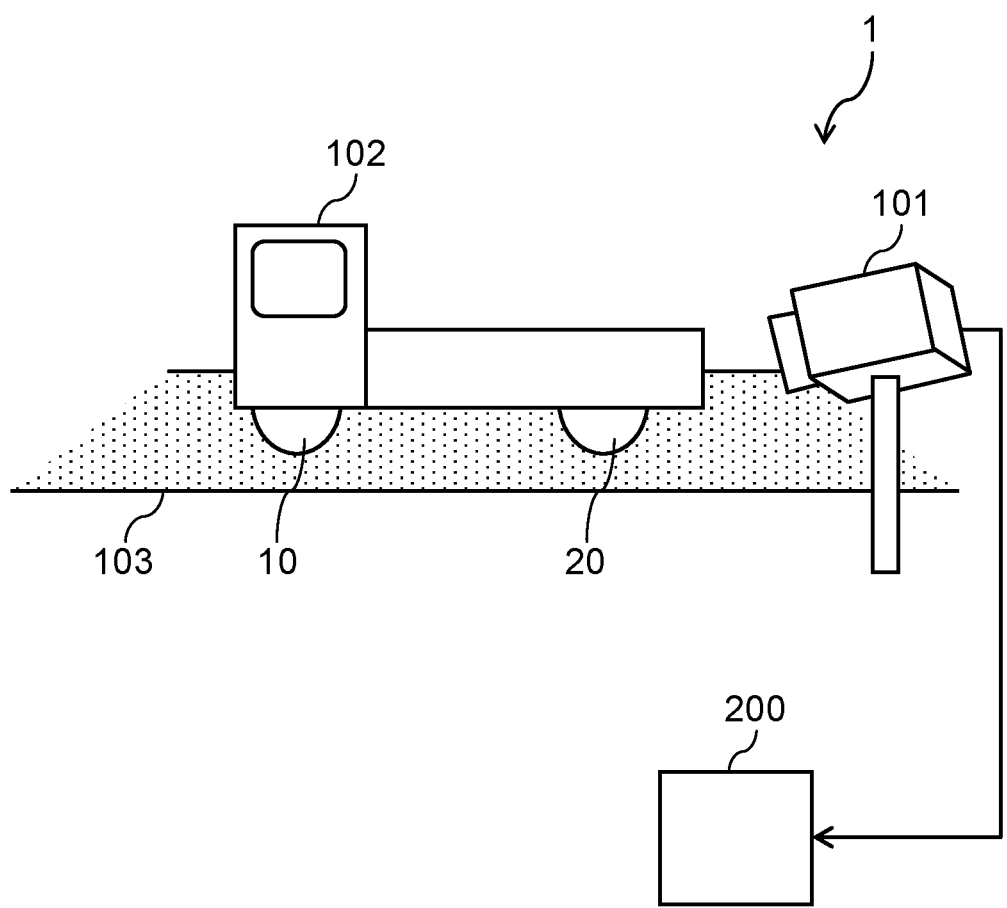
FIG. 1 is a view schematically illustrating one example of a state in which an axle load is measured according to a first exemplary embodiment.

FIG. 1 is a view schematically illustrating one example of a state in which load meter 200 according to a first exemplary embodiment measures an axle load of vehicle 102. As illustrated in FIG. 1, load measuring system 1 according to the first exemplary embodiment includes imaging device 101 and load meter 200.

Herein, for example, load meter 200 is connected to imaging device 101 for capturing an image of road 103 on which vehicle 102 travels. Moreover, a plurality of captured images of road 103 captured by imaging device 101 is input to load meter 200. Load meter 200 uses the input captured images, thereby calibrating a displacement coefficient to be used when the axle load of vehicle 102 is calculated. For example, vehicle 102 is a truck, and road 103 is an asphalt road.

Figures 2, 3:
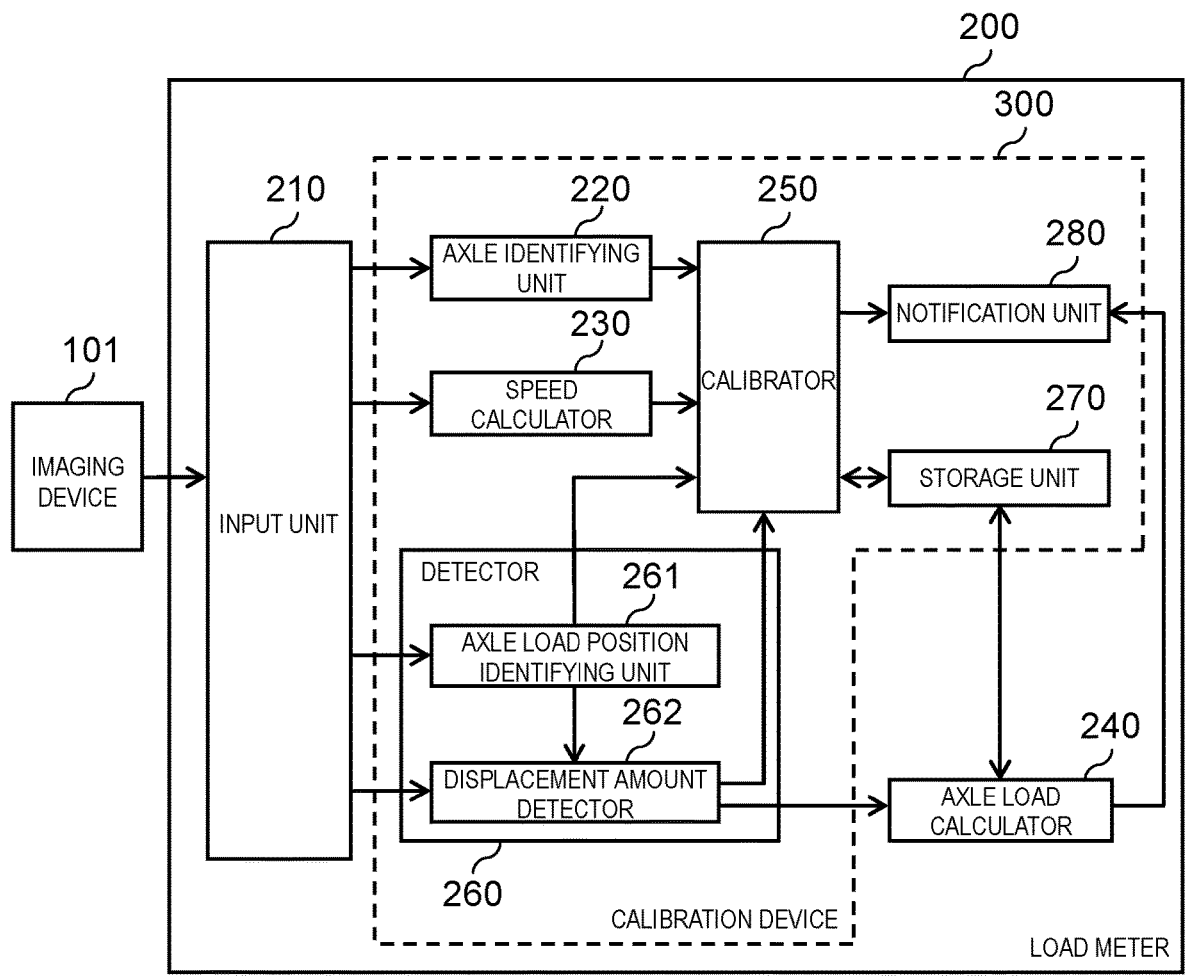
FIG. 2 is a block diagram illustrating a configuration of a load meter according to the first exemplary embodiment.
FIG. 3 is a configuration table of displacement coefficient data.

FIG. 2 is a block diagram illustrating a configuration of load meter 200. As illustrated in FIG. 2, load meter 200 includes input unit 210, axle load calculator 240, and calibration device 300. Calibration device 300 includes axle identifying unit 220, speed calculator 230, calibrator 250, detector 260, storage unit 270, and notification unit 280. In addition, detector 260 includes axle load position identifying unit 261 and displacement amount detector 262. Calibration device 300 is a calibration device for calibrating load meter 200 that measures an axle load of a vehicle.

For example, load meter 200 is implemented in such a way that a microprocessor (not illustrated) in a computer (not illustrated) provided with the microprocessor and a memory (not illustrated) executes a program stored in the memory.

Input unit 210 receives an input of the plurality of captured images of the road captured by imaging device 101. Herein, input unit 210, for example, receives an input of a digital image with 4096 pixels×2160 pixels as the captured image. Input unit 210 outputs the received captured images to axle identifying unit 220, speed calculator 230, axle load position identifying unit 261, and displacement amount detector 262.

The captured images are input through wireless or wired communication or through a recording medium.

Detector 260 detects, at a predetermined point, a displacement amount corresponding to displacement caused on a road surface of a road when a vehicle passes.

When a vehicle is included in the captured image received by input unit 210, axle load position identifying unit 261 identifies an axle load position of the vehicle in the captured image. More specifically, axle load position identifying unit 261 performs image recognition processing on the captured image to determine whether or not the vehicle is included in the captured image. Then, when the vehicle is included in the captured image, axle load position identifying unit 261 recognizes a tire of the vehicle by further image recognition processing. Axle load position identifying unit 261 then identifies an area on the road, which corresponds to a lowermost point of the tire, as an axle load position. Axle load position identifying unit 261 outputs the identified axle load position to calibrator 250 and displacement amount detector 262.

Displacement amount detector 262 detects, by using the captured image received by input unit 210, a displacement amount, in the captured image, corresponding to displacement caused on the road when an axle load is applied. Particularly, when the axle load position is input from axle load position identifying unit 261, displacement amount detector 262 detects a displacement amount corresponding to displacement at the identified axle load position. By comparing a captured image in which no displacement is caused on the road and a captured image in which displacement is caused on the road, from among the plurality of captured images received by input unit 210, displacement amount detector 262 detects a displacement amount corresponding to the displacement. Displacement amount detector 262 can detect a displacement amount between the captured images by using block matching, a correlation method, or an optical flow. For example, displacement amount detector 262 calculates, as the displacement amount, the number of pixels that indicates a difference in pixel positions corresponding to an identical point on the road between the captured images. Further, the captured image in which no displacement is caused on the road may be a captured image in which the road is captured in advance in a state in which the vehicle is not present, a captured image in which an image change amount is less than or equal to a certain level among a plurality of captured images of the road captured in succession, or a captured image determined that the vehicle is not present through the image recognition processing.

When the vehicle is included in the captured image received by input unit 210, axle identifying unit 220 identifies where the axle of the vehicle in the captured image is located as viewed from a front (or a rear) of the series of axels. More specifically, axle identifying unit 220 performs the image recognition processing on the captured image to determine whether or not the vehicle is included in the captured image. Then, when the vehicle is included in the captured image, axle identifying unit 220 recognizes the axle of the vehicle by further image recognition processing. Axle identifying unit 220 then identifies an axle number from the front for each vehicle. Axle identifying unit 220 outputs the identified axle number to calibrator 250. Here, as illustrated in FIG. 1, axle identifying unit 220, for example, identifies a forefront axle of vehicle 102 as first axle 10. Further, axle identifying unit 220, for example, identifies a subsequent axle as second axle 20.

When the vehicle is included in the captured image received by input unit 210, speed calculator 230 calculates a speed of the vehicle. More specifically, speed calculator 230 performs the image recognition processing on the captured image to determine whether or not the vehicle is included in the captured image. Then, speed calculator 230 calculates the speed of the vehicle based on a difference in positions of an identical vehicle between different frames (for example, between adjacent frames). By previously measuring a positional relationship between imaging device 101 and the road, speed calculator 230 can geometrically perform scale conversion between a movement amount in the captured image and an actual movement amount. Speed calculator 230 outputs the calculated speed to calibrator 250.

Calibrator 250 aggregates the displacement amounts detected by detector 260 to generate a histogram of the displacement amounts. Then, calibrator 250 updates a displacement coefficient based on a shape of the histogram of the displacement amounts.

Calibrator 250 aggregates the displacement amounts detected by detector 260 for the plurality of captured images in which different vehicles are captured. Particularly, when the axle load position is identified by axle load position identifying unit 261, calibrator 250 aggregates the displacement amounts by associating the identified axle load position and the displacement amount with each other. Similarly, calibrator 250 aggregates the displacement amounts by dividing the displacement amounts for each axle number identified by axle identifying unit 220 and for each speed calculated by speed calculator 230. For example, calibrator 250 aggregates the displacement amounts by dividing the displacement amounts for the first axle and the second axle. Further, calibrator 250, for example, aggregates the displacement amounts by dividing the displacement amounts for a low speed (for example, 0 km/h to 30 km/h), a medium speed (for example, 30 km/h to 60 km/h), a high speed (for example, 60 km/h or more), and the like. Calibrator 250 may aggregate the displacement amounts by combining all the conditions, or may aggregate the displacement amounts by combining only a part of the conditions. Further, calibrator 250 may aggregate the displacement amounts by combining only the condition, such as the first axle (the foremost axle of the vehicle), and the condition, such as 30 km/h or more. By dividing (or limiting) the conditions, calibrator 250 can easily obtain a characteristic of the histogram of the displacement amounts, which will be described below.

Storage unit 270 stores first information indicating a relation between the axle load and the displacement amount. More specifically, the first information is a relational equation indicating the relation between the axle load and the displacement amount when the displacement is caused on the road due to application of the axle load to the road, and a displacement coefficient used for this relational equation. Storage unit 270 may be implemented by a memory (not illustrated) included in load meter 200 or a database of an external device capable of performing communication.

Axle load w (kg) is a function of displacement amount d (the number of pixels). In other words, axle load w is represented by an equation of w=f(d) using function f. Herein, function f is handled after being approximated with a linear equation. Accordingly, storage unit 270 stores the linear equation (w=αd) as the relational equation. Further, storage unit 270 stores coefficient α as the displacement coefficient.

This displacement coefficient α has a displacement coefficient value associated with each of a plurality of positions that can be identified as an axle load position by axle load position identifying unit 261. With this configuration, differences including a difference in distances from imaging device 101 to the axle load position, a difference in compositions of a material such as asphalt, a difference in road surface temperatures, and a difference in deterioration states of the road surface can be reflected on displacement coefficient α for each area on the road. Herein, displacement coefficient α has, for each area (hereinafter written as "local area") of 10 pixels in a horizontal direction (x direction) and 10 pixels in a vertical direction (y direction), for example, in the captured image, a displacement coefficient value corresponding to the local area.

FIG. 3 is a table illustrating one example of displacement coefficient α stored in storage unit 270.

Storage unit 270 stores a predetermined relational equation and a predetermined displacement coefficient in an initial state. When a displacement coefficient is newly calculated by calibrator 250, the stored displacement coefficient is updated by the newly calculated displacement coefficient.

Axle load calculator 240 calculates an axle load of a vehicle present on the road based on the displacement amount detected by detector 260 and the first information stored in storage unit 270. Particularly, when the axle load position is identified by axle load position identifying unit 261, axle load calculator 240 calculates the axle load based on the displacement amount at the identified axle load position. More specifically, axle load calculator 240 calculates axle load w by multiplying displacement amount d detected by displacement amount detector 262 by a displacement coefficient value corresponding to an area including the axle load position identified by axle load position identifying unit 261. Further, storage unit 270 may store the axle number identified by axle identifying unit 220 and the displacement coefficient according to the speed calculated by speed calculator 230. Moreover, axle load calculator 240 may calculate an axle load by using the axle number of the vehicle and the displacement coefficient according to the speed.

Further, storage unit 270 stores second information pertaining to the axle load. The second information is an axle load value of the first axle of the vehicle of which a traffic frequency is expected to be highest in road 103.

Calibrator 250 calculates a displacement coefficient for identifying a relation between the axle load and the displacement amount based on the displacement amount detected by detector 260 and the second information. Then, calibrator 250 updates the displacement coefficient stored in storage unit 270 by using the calculated displacement coefficient. A detail of a method for calculating the displacement coefficient will be described in a calibration process, which will be described below.

When a difference between the displacement coefficient newly calculated by calibrator 250 and the first information is a predetermined reference value or more, notification unit 280 notifies the outside of the system of this situation. For example, after notification unit 280 notifies an external user through wired or wireless communication, calibrator 250 may update the displacement coefficient based on a judgment of the user.

An operation of load meter 200 (particularly calibrator 250) having the above configuration will be described with reference to the drawings hereafter.

[1-2. Operation]

Load meter 200 performs, as its characteristic operation, a first measurement process and the calibration process.

[1-2-1. First Measurement Process]

The first measurement process is a process, when a captured image including a vehicle is input to load meter 200, for calculating an axle load of the vehicle.

FIG. 4A is a flowchart for describing an operation of the first measurement process. This first measurement process is started when the captured image including the vehicle (hereinafter written as "captured image A") is input to input unit 210.

When the first measurement process is started, input unit 210 acquires captured image A input from imaging device 101 (step S10).

Figure 5:
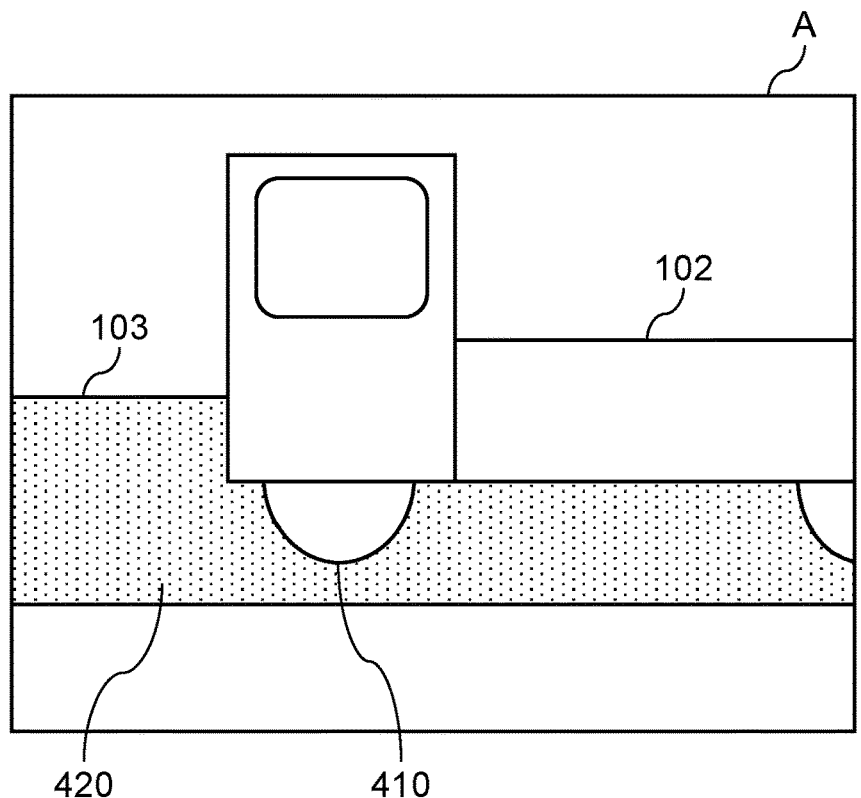
FIG. 5 is a view illustrating one example of captured image A.

FIG. 5 is a view illustrating one example of captured image A acquired. As illustrated in FIG. 5, captured image A includes vehicle 102 traveling on road 103. Also, this vehicle 102 is in contact with road 103 at lowermost point 410 of a tire of vehicle 102. Further, in FIG. 5, area 420 includes a point that is not identified as an axle load position.

In FIG. 4A, upon the acquisition of captured image A, axle load position identifying unit 261 performs image recognition processing to identify lowermost point 410 of the tire of vehicle 102. Then, axle load position identifying unit 261 identifies an area on road 103, which corresponds to identified lowermost point 410, as the axle load position (step S20).

Figure 6:
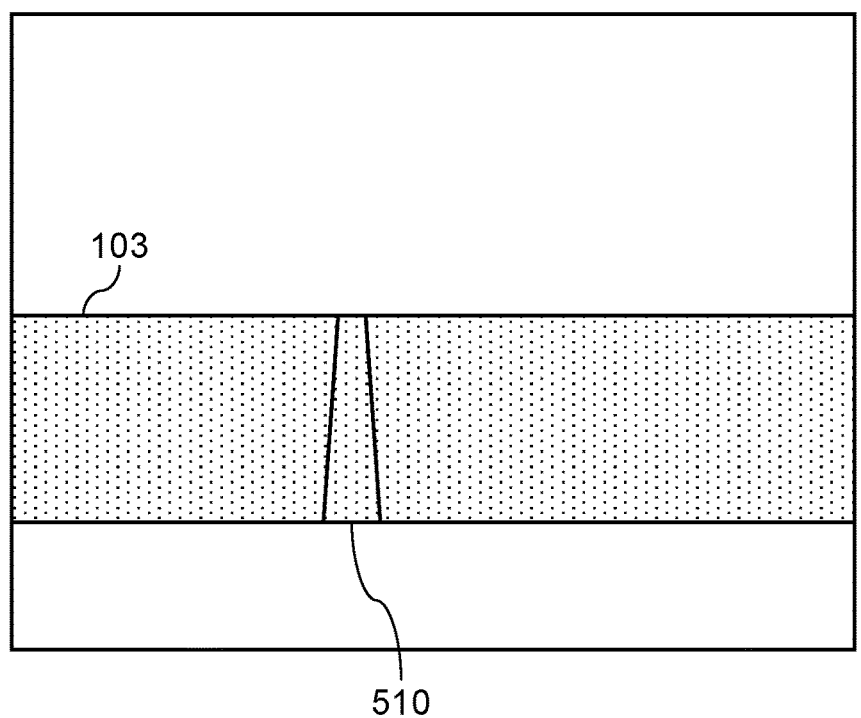
FIG. 6 is a view illustrating one example of a captured image.

Herein, the area identified by axle load position identifying unit 261 may not necessarily be an area consisting only of one point (one pixel). The area identified by axle load position identifying unit 261 may be a local image area consisting of a plurality of adjacent pixels. It is to be noted that axle load position identifying unit 261 may limit an axle load detection range in which an axle load is detected to an area of road 103. Further, axle load position identifying unit 261 may limit the axle load detection range in which the axle load is detected to a part of road 103, as in area 510 in FIG. 6. Axle load position identifying unit 261 may limit the detection range according to designation of a user, or may limit the detection range according to the designation of the user and a result of image recognition of a color or a texture of road 103. Limiting the axle load detection range provides an effect of reducing an image processing amount. Therefore, the image processing amount for identifying the axle load position can be reduced. It is to be noted that, when a plurality of tires is in contact with road 103 in the captured image, axle load position identifying unit 261 identifies each contact position as the axle load position.

Upon the identification of the axle load position, displacement amount detector 262 detects a displacement amount corresponding to displacement caused at the identified axle load position on road 103 (step S30). Displacement amount detector 262 detects a displacement amount by using captured image A and a captured image in which no displacement is caused (hereinafter written as "captured image B") from among the captured images acquired by input unit 210. If captured image B has not been acquired by input unit 210 before the axle load position is identified, displacement amount detector 262 waits until captured image B is acquired by input unit 210, and then detects the displacement amount.

Figure 7:
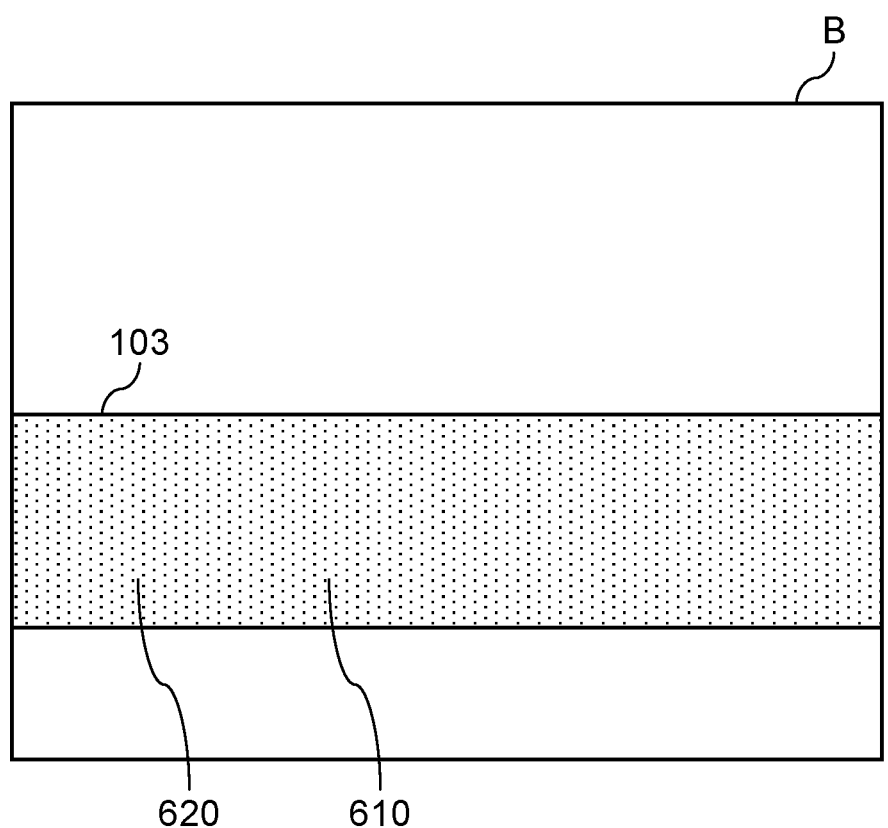
FIG. 7 is a view illustrating one example of captured image B.

FIG. 7 is one example of captured image B acquired. Road 103 is imaged from an identical point of view in captured image A (see FIG. 5) and captured image B. Area 610 on road 103 in captured image B is an area identical to the area on road 103, which corresponds to lowermost point 410 of the tire, in captured image A. Further, area 620 on road 103 in captured image B is an area identical to area 420 on road 103 in captured image A.

Displacement amount detector 262 detects a displacement amount caused between an area on road 103, which corresponds to lowermost point 410, in captured image A, and area 610 in captured image B. Herein, since a displacement amount on road 103 caused by an axle load of an ordinary vehicle is very small, it is desirable to suppress an effect of shake of imaging device 101 due to vibration or the like of the vehicle traveling on road 103. As one example, displacement amount detector 262 selects, in both captured image A and captured image B, an identical point that is not identified as the axle load position (for example, area 420 in captured image A and area 620 in captured image B). Then, displacement amount detector 262 calculates a displacement amount between the selected areas (hereinafter written as a "non-axle load position displacement amount"). Displacement amount detector 262 subtracts this non-axle load position displacement amount from a displacement amount caused between the area on road 103, which corresponds to lowermost point 410 of the tire, in captured image A, and area 610 in captured image B. Accordingly, displacement amount detector 262 corrects the displacement amount. Thus, the effect of the shake of imaging device 101 can be suppressed. Besides, the effect of the shake of imaging device 101 can be also suppressed by a method using an optical image stabilization technology, a method using a mechanical mechanism such as a sensor shift method, or the like.

In FIG. 4A, upon the detection of the displacement amount, axle load calculator 240 identifies a displacement coefficient value corresponding to the axle load position identified by axle load position identifying unit 261 (step S40). In other words, axle load calculator 240 refers to displacement coefficient $\alpha$ stored in storage unit 270 (see FIG. 3) to identify a displacement coefficient value corresponding to the axle load position identified by axle load position identifying unit 261.

Upon the identification of the displacement coefficient value, axle load calculator 240 multiplies the identified displacement coefficient value by the displacement amount detected by displacement amount detector 262 to calculate an axle load (step S50).

Upon the calculation of the axle load, axle load calculator 240 outputs a numerical value of the calculated axle load to the outside (step S60). Herein, when the numerical value of the calculated axle load is greater than a predetermined reference value, axle load calculator 240 may notify the user of this situation through notification unit 280, instead of outputting the numerical value of the calculated axle load to the outside. In this case, the reference value may be an absolute value or may be a relative value. In addition, for example, when the reference value is more than or equal to 30 times a representative value of a histogram described below, axle load calculator 240 may notify the user of this situation after storing the corresponding captured image. With this configuration, the user can be notified of a relatively high possibility that the vehicle included in the corresponding captured image is overloaded.

After the process in step S60 is ended, load meter 200 ends the first measurement process.

[1-2-2. Calibration Process]

The calibration process is a process in which calibrator 250 updates the displacement coefficient stored in storage unit 270.

Figure 4B:
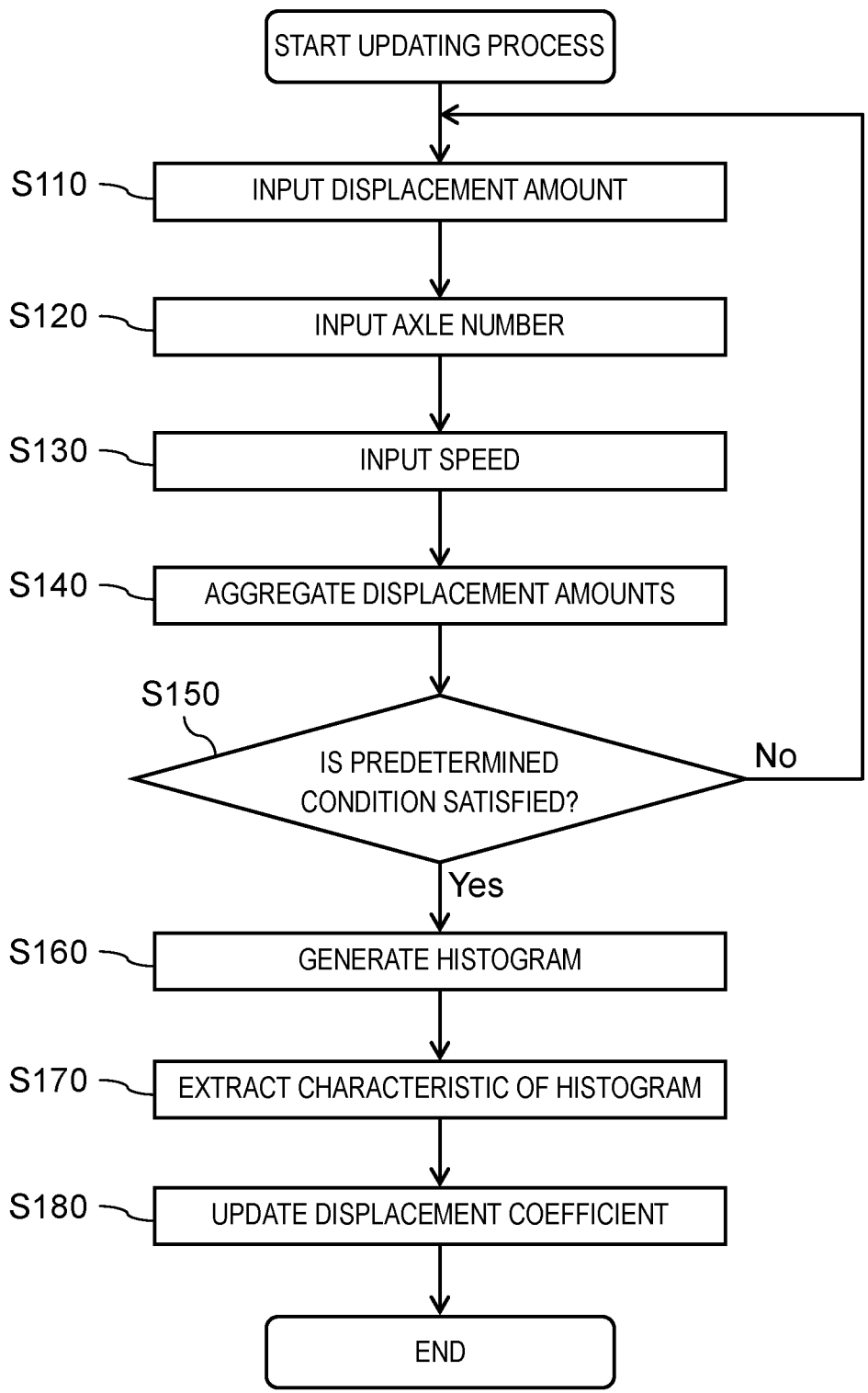
FIG. 4B is a flowchart for describing an operation of a calibration process.

FIG. 4B is a flowchart of the calibration process. This calibration process is started when load meter 200 is activated.

When the calibration process is started, in a case where a load position is identified by axle load position identifying unit 261, calibrator 250 inputs a displacement amount every time the displacement amount is detected by displacement amount detector 262 (step S110). Similarly, calibrator 250 inputs an axle number from axle identifying unit 220 (step S120), and inputs a speed from speed calculator 230 (step S130). Calibrator 250 aggregates displacement amounts by associating the detected displacement amount with every condition of the identified axle load position, the axle number, and the speed (step S140). Herein, calibrator 250 may not generate a histogram of displacement amounts for combinations of all the conditions, and may generate a histogram of displacement amounts for only a limited condition, such as a combination of a specific axle number and a specific speed. It is to be noted that steps S110 to S130 may not be provided in this order.

Herein, calibrator 250 aggregates the detected displacement amounts for each local area associated with the displacement coefficient value.

Load meter 200 repeats the processes in steps S110 to S140 until a predetermined condition is satisfied. Herein, the predetermined condition corresponds to, for example, a case where a predetermined date has come, a case where a predetermined number of displacement amounts are aggregated, or a case where the user performs a predetermined operation to load meter 200.

When the predetermined condition is satisfied in the process in step S150 (Yes in step S150), calibrator 250 generates a histogram of displacement amounts aggregated in a certain period in the past for each local area based on an obtained aggregation result (step S160).

Figure 8A:
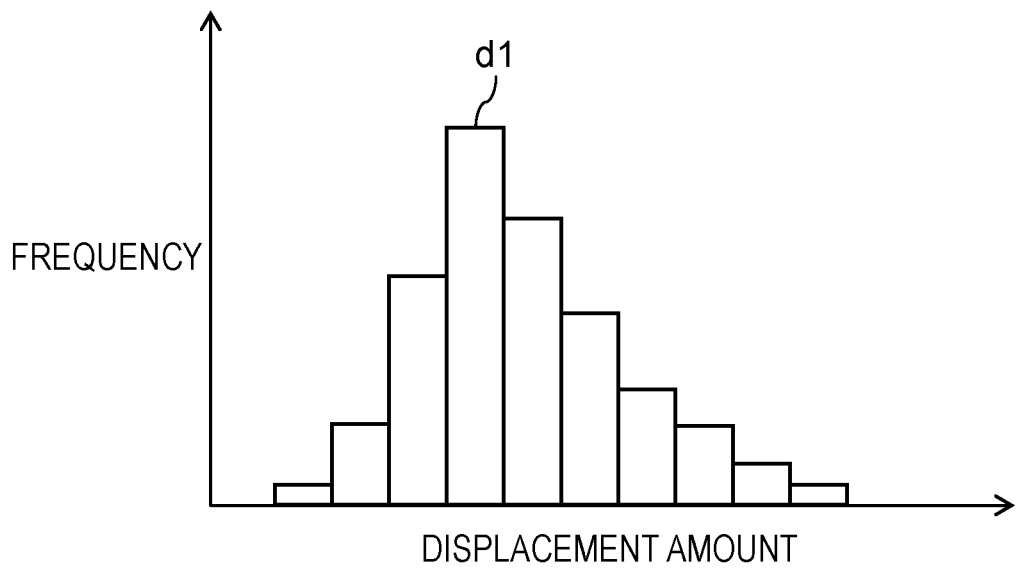
FIG. 8A is a graph illustrating one example of a histogram generated by a calibrator.
Figure 8B:
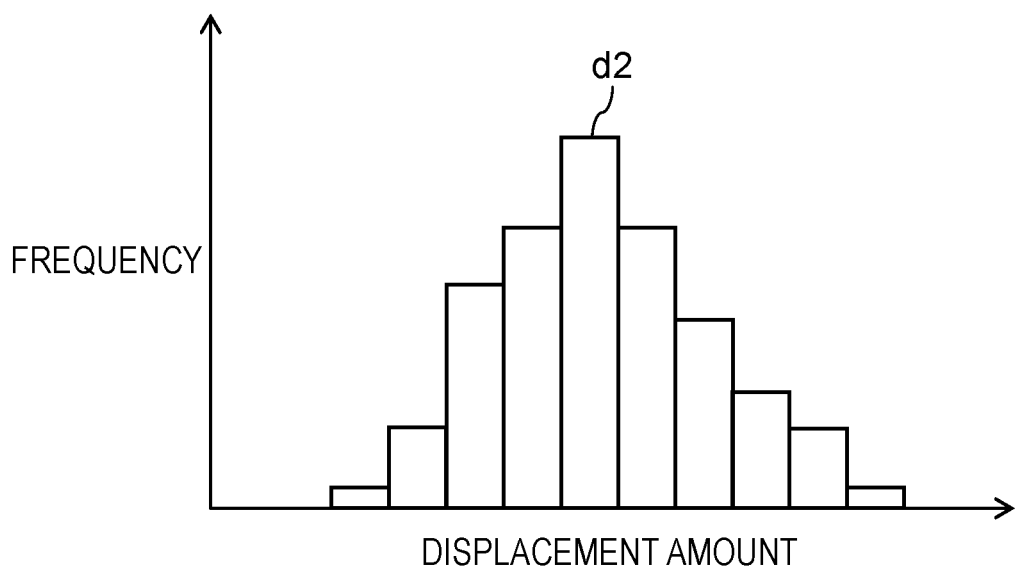
FIG. 8B is a graph illustrating one example of a histogram generated by the calibrator.

Each of FIGS. 8A and 8B is a diagram illustrating one example of the histogram generated by calibrator 250 for each local area. In FIGS. 8A and 8B, vertical axes represent a frequency, and horizontal axes represent a displacement amount. The histograms illustrated in FIGS. 8A and 8B are examples of histograms with mutually different aggregation periods and classified by an identical local area, an identical axle number, and an identical speed. A reason that shapes of these histograms are different is that road surface temperatures are mutually different, deterioration states of the road surfaces are mutually different, or the like, in these aggregation periods.

Upon the generation of the histogram for each local area, calibrator 250 extracts a characteristic of the histogram (step S170). Then, calibrator 250 calculates a displacement coefficient of the corresponding local area based on the characteristic of the histogram and the second information stored in storage unit 270. Then, calibrator 250 updates the displacement coefficient stored in storage unit 270 to the calculated displacement coefficient (step S180). Herein, the characteristic of the histogram indicates a representative value of the displacement amount obtained from the shape of the histogram, such as an average, a mode, a maximum, a minimum, or an average of lower levels with a certain fraction. A case where the mode of the histogram is used as the characteristic of the histogram is described herein as one example.

Storage unit 270 stores, as the second information, the axle load value of the first axle of the vehicle of which the traffic frequency is expected to be highest in road 103.

Calibrator 250 calculates the displacement coefficient by dividing the second information by the mode serving as the representative value of the displacement amount obtained from the shape of the histogram.

For example, calibrator 250 calculates displacement coefficient α1 based on the histogram illustrated in FIG. 8A and the following Equation (1).

$$\alpha 1 = w1/d1 \quad (1)$$

where the second information is represented by w1, and the mode of the histogram illustrated in FIG. 8A is represented by d1.

Further, for example, calibrator 250 calculates displacement coefficient α2 based on the histogram illustrated in FIG. 8B and the following Equation (2).

$$\alpha 2 = w1/d2 \quad (2)$$

where the second information is represented by w1, and the mode of the histogram illustrated in FIG. 8B is represented by d2.

It is to be noted that, if the expected characteristic of the histogram cannot appropriately be obtained, such as the case where precision of the histogram is low because of the small number of traveling vehicles (for example, less than or equal to a certain number), calibrator 250 may calculate the displacement coefficient by using a substitute value instead of the mode. For example, calibrator 250 may use a displacement coefficient in a past time period, or may continuously use the displacement coefficient which has been used before updating the histogram, as the substitute value.

Further, the histogram of the displacement amounts may have a plurality of frequency peak values. In this case, calibrator 250 may use an average, a mode, a maximum, or a minimum within a certain range of a displacement amount. With this configuration, a stable characteristic of the histogram can be obtained.

It is to be noted that, when displacement coefficient α depends on a speed of a vehicle, speed calculator 230 calculates speed v of the vehicle from a movement amount of the vehicle in captured images, in which road 103 is continuously captured in a time-series manner. Also, calibrator 250 may calculate displacement coefficient α(v) for each speed v. Further, calibrator 250 may update the histogram or calculate the displacement coefficient only when the speed is within a certain range (for example, when speed v of the vehicle <20 km/h).

In FIG. 4B, after calculating the displacement coefficient, calibrator 250 overwrites the displacement coefficient stored in storage unit 270 by using the calculated displacement coefficient, thereby updating the displacement coefficient (step S180).

After the process in step S180 is ended, load meter 200 proceeds again to the process in step S110, and repeats the processes in step S110 and subsequent steps.

It is to be noted that calibrator 250 may notify the outside of the need to calibrate the displacement coefficient without automatically updating the displacement coefficient. For example, before step S180, calibrator 250 notifies a manager on the outside of the system of the need to calibrate the displacement coefficient by using notification unit 280 through wired or wireless communication. Then, after the manager confirms the notification, calibrator 250 may update the displacement coefficient. Further, load measuring system 1 may function as a system that notifies timing for executing conventional calibration by performing only notification.

[1-3. Effects Etc.]

As described above, load meter 200 according to the first exemplary embodiment includes detector 260, storage unit 270, and axle load calculator 240. Detector 260 detects, by using captured image A obtained by capturing road 103 and vehicle 102 present on road 103, a displacement amount, in captured image A, corresponding to displacement caused on road 103 by application of an axle load of vehicle 102. Storage unit 270 stores information indicating a relation between the axle load and the displacement amount. Axle load calculator 240 calculates an axle load based on the displacement amount and the information.

Further, calibration device 300 detects a displacement amount caused by the axle load of vehicle 102 traveling on road 103 from the captured image captured by external imaging device 101. Calibrator 250 generates a histogram of the displacement amounts by aggregating the displacement amounts during passage of the plurality of vehicles. Calibrator 250 can update a displacement coefficient stored in storage unit 270 by using a characteristic of this histogram and second information about the axle load recorded in storage unit 270.

Accordingly, when load meter 200 is calibrated, there is no need to perform calibration work by preparing a vehicle whose axle load is known. Therefore, calibrator 250 can automatically implement calibration of load measuring system 1.

Further, by selectively generating a histogram for an axle number, calibrator 250 can select an axle that can easily obtain a shape characteristic of the histogram. Accordingly, calibration precision improves. Further, by selectively generating a histogram for a speed of the vehicle, calibrator 250 can select a speed that can easily obtain a shape characteristic of the histogram. Accordingly, calibration precision improves.

Further, calibrator 250 may calculate a displacement coefficient based only on a shape of a histogram corresponding to a first axle (a forefront axle of the vehicle) as the axle number. For example, it is difficult to precisely calculate an axle load of an axle other than the first axle due to an influence of a load and the like placed on a platform of the vehicle. On the other hand, a load of an engine of the vehicle is applied to an axle load of the first axle, and the axle load of the first axle is hardly affected by a weight of the load on the platform of the vehicle. Accordingly, the axle load of the first axle is calculated more precisely than the axle load of the other axles. Accordingly, calibrator 250 can precisely calculate a displacement coefficient by calculating the displacement coefficient based only on the shape of the histogram corresponding to the first axle.

Further, when displacement is measured using an image, it is desirable that calibration device 300 calibrate a displacement coefficient for each position of road 103. With this configuration, multipoint calibration can be easily implemented by automatic calibration. Accordingly, cost and labor for maintenance and management of the measuring system can be reduced.

Further, even when the calibration is not performed automatically, calibration device 300 can automatically detect timing to be calibrated. Accordingly, updating work can be performed in a necessary and sufficient frequency.

The displacement coefficient for calculating the axle load of the vehicle is corrected in the present exemplary embodiment. However, a displacement coefficient for calculating a load of a vehicle may be corrected. A load meter previously records a relation between the load of the vehicle and an axle load of the vehicle. The load meter can calculate the load of the vehicle by measuring the axle load of the vehicle. As with load meter 200, this load meter generates a histogram of displacement amounts, and updates a displacement coefficient for calculating the load of the vehicle based on a shape of the histogram.

The load meter measures the axle load of the vehicle in the present exemplary embodiment. However, a load meter may measure a load of an entire vehicle in an area where the entire vehicle is placed. In this case, a detector detects displacement amounts at positions of a plurality of axles, and calculates an average of the displacement amounts. As with load meter 200, this load meter generates a histogram of the averages of the displacement amounts, and updates a displacement coefficient for calculating the load of the vehicle based on a shape of the histogram.

Further, storage unit 270 may record a histogram of loads or axle loads of a vehicle traveling on a road. Moreover, calibrator 250 may update a displacement coefficient based on a shape of a histogram of displacement amounts and a shape of the histogram of the loads or the axle loads of the vehicle.

[1-4. Modified Example]

A load meter according to a modified example will be described with reference to FIGS. 8C and 8D. It is to be noted that the load meter according to the modified example has a configuration similar to the configuration of above-described load meter 200.

FIG. 8C is a graph illustrating one example of a histogram of load values acquired in advance. More specifically, the histogram in FIG. 8C is generated by using a calibrated load sensor or load meter. In the present modified example, storage unit 270 stores information indicating this histogram.

In the histogram in FIG. 8C, a mode of output values is frequency s3. The histogram in FIG. 8C has three peak values (frequency s4, frequency s5, and frequency s6) other than frequency s3.

FIG. 8D is a graph illustrating one example of a histogram of displacement amounts generated by calibrator 250. The histogram in FIG. 8D is generated from captured images of a road at a position closer to a position of the road in which the above-described load sensor is installed. In other words, the histogram in FIG. 8C corresponds to the histogram in FIG. 8D.

In the histogram in FIG. 8D, a mode of the displacement amounts is frequency d3. The histogram in FIG. 8D has three peak values (frequency d4, frequency d5, and frequency d6) other than frequency d3. Herein, as illustrated in FIGS. 8C and 8D, it is considered that frequency s3 corresponds to frequency d3. Similarly, it is considered that frequency s4, frequency s5, and frequency s6 respectively correspond to frequency d4, frequency d5, and frequency d6.

Calibrator 250 of calibration device 300 in the present modified example updates a displacement coefficient based on shapes of the histogram in FIG. 8C and the histogram in FIG. 8D. Specifically, calibrator 250 calculates the displacement coefficient such that axle load values at frequencies s3 to s6 in FIG. 8C substantially coincide with axle load values corresponding to the displacement amounts at frequencies d3 to d6 in FIG. 8D, respectively. With this configuration, calibrator 250 can update the displacement coefficient by using the highly reliable existing histograms generated by measuring axles of many vehicles. Further, calibrator 250 can calculate the displacement coefficient more precisely by using characteristics of the plurality of histograms (that is, the peak values of the plurality of histograms).

It is to be noted that, upon the calculation of the displacement coefficient, calibrator 250 may not use frequency s3 and frequency d3 serving as the modes. In the present modified example, a vehicle corresponding to the mode of the histogram is a vehicle having a light axle load. When the light axle load is measured, an error easily occurs in the measurement of the axle load. Accordingly, frequency s3 and frequency d3 serving as the modes easily include many errors. Because of this, calibrator 250 can precisely calculate the displacement coefficient by not using frequency s3 and frequency d3. As described above, calibrator 250 may update the displacement coefficient based only on a shape of a histogram corresponding to a section that does not include the mode (frequency d3) in the shape of the histogram in FIG. 8D.

Further, in the present modified example, calibrator 250 calculates the displacement coefficient by using the peak values of the histogram. However, calibrator 250 may calculate the displacement coefficient by using other shape characteristics of the histogram. For example, calibrator 250 may use a position serving as a valley of the histogram as the shape characteristic of the histogram.

Second Exemplary Embodiment

Herein, a load meter according to a second exemplary embodiment configured by modifying a part of the configuration of load meter 200 in the first exemplary embodiment will be described as one aspect of the present disclosure.

Figure 9:
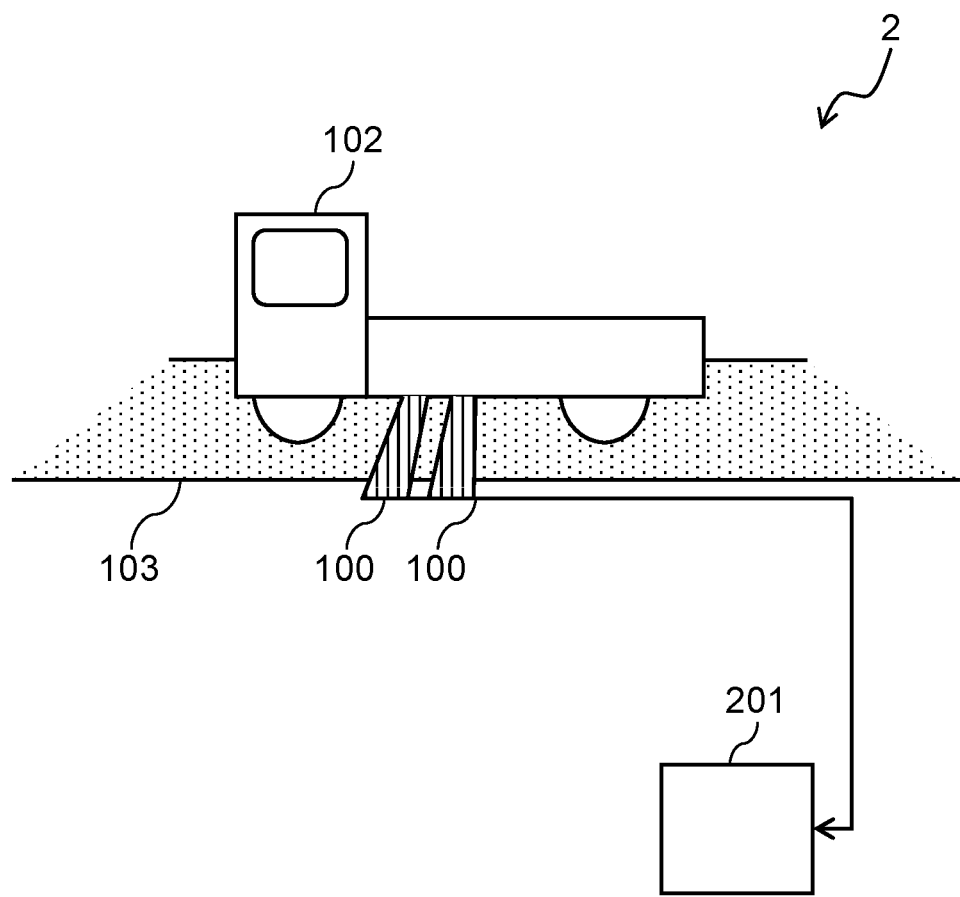
FIG. 9 is a view schematically illustrating one example of a state in which an axle load is measured according to a second exemplary embodiment.

FIG. 9 is a view schematically illustrating one example of a state in which an axle load is measured according to the second exemplary embodiment of the present disclosure. As illustrated in FIG. 9, load measuring system 2 according to the second exemplary embodiment includes two load sensors 100 and load meter 201.

Figure 10:
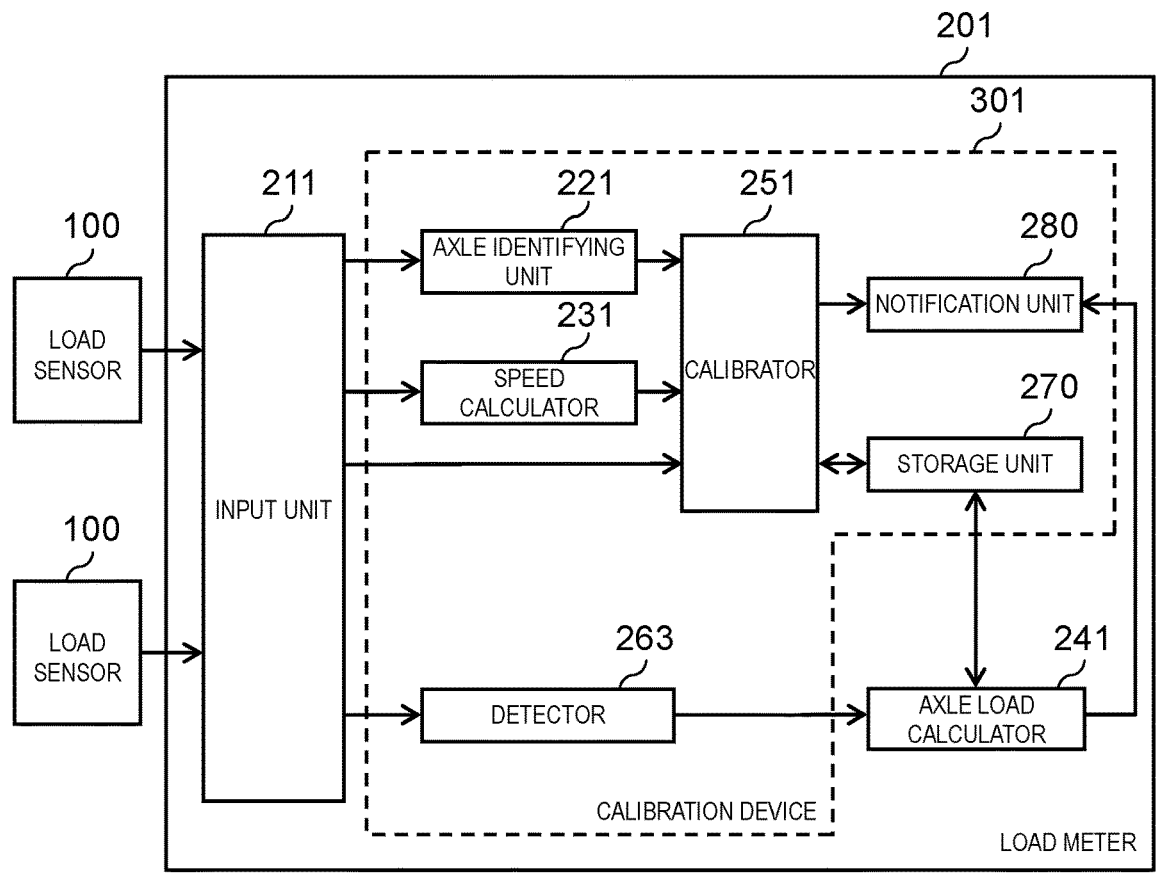
FIG. 10 is a block diagram illustrating a configuration of a load meter according to the second exemplary embodiment.

Load meter 200 in the first exemplary embodiment acquires a captured image from imaging device 101, and calculates a road surface displacement, an axle number, and a speed from this image. On the other hand, in load meter 201 in the second exemplary embodiment, as illustrated in FIGS. 9 and 10, input unit 211 acquires an output value of load sensor (a strain gauge, a piezoelectric element, or the like) 100 installed in road 103. Load meter 201 detects a displacement amount from the output value of load sensor 100. Herein, as illustrated in FIG. 9, two or more load sensors 100 are installed adjacent to each other, and a positional relationship of load sensors 100 is already known.

Hereafter, a detail of this load meter 201 will be described with reference to the drawings, focusing on differences from load meter 200 in the first exemplary embodiment.

[2-1. Configuration]

FIG. 10 is a block diagram illustrating a configuration of load meter 201 in the second exemplary embodiment.

As illustrated in FIG. 10, load meter 201 includes input unit 211, axle load calculator 241, and calibration device 301. Calibration device 301 includes axle identifying unit 221, speed calculator 231, calibrator 251, detector 263, storage unit 270, and notification unit 280.

As illustrated in FIG. 10, load meter 201 is different from load meter 200 (see FIG. 2) in the first exemplary embodiment in that input unit 211 acquires the output value of load sensor 100.

Axle identifying unit 221 counts the number of axles from the number of changes in the output value of load sensor 100 acquired by input unit 211 accompanied by passage of a vehicle. If a certain amount of time has passed since the output of load sensor 100, axle identifying unit 221 determines the passage of the vehicle. Similarly, speed calculator 231 measures the changes in the output value of load sensor 100 acquired by input unit 211 accompanied by the passage of the vehicle. Then, speed calculator 231 calculates a speed of the vehicle by using a passage time between the plurality of load sensors 100 and a known installation distance between load sensors 100. Instead of the displacement amount in the first exemplary embodiment, calibrator 251 and storage unit 270 each use the output value of load sensor 100 acquired by input unit 211. Similarly, instead of the displacement amount in the first exemplary embodiment, axle load calculator 241 calculates an axle load by using the output value of load sensor 100 acquired by input unit 211. Detector 263 calculates a displacement amount from the output value of load sensor 100.

[2-2. Operation]

Load meter 201 performs, as its characteristic operation, a second measurement process configured by modifying a part of the first measurement process in the first exemplary embodiment.

Specifically, the second measurement process is different from the first measurement process in that a procedure of steps S10 to S30 in the flowchart of FIG. 4A in the first exemplary embodiment is omitted. Further, the second measurement process is different from the first measurement process in that detector 263 treats an amount of change in the output value of load sensor 100 as a displacement amount. Further, in step S120, axle identifying unit 221 identifies an axle number from the number of changes in the output value of load sensor 100. Further, in step S130, speed calculator 231 calculates a speed of the vehicle from a time difference of changes in the output values of the plurality of load sensors 100 and the installation distance between load sensors 100. The other operations are identical to the operations in the first exemplary embodiment.

[2-3. Effects Etc.]

As described above, load meter 201 uses the output value obtained by load sensor 100. Although input information is different from the input information in the first exemplary embodiment, calibrator 251 aggregates the output values of load sensor 100 accompanied by the passage of ordinary passing vehicles through the operation identical to the operation in the first exemplary embodiment. With this configuration, calibration of load meter 201 can be automatically performed. Accordingly, cost and labor for maintenance and management of the measuring system can be reduced.

Further, even when the calibration is not performed automatically, calibration device 301 can automatically determine timing to be calibrated. Accordingly, updating work can be performed in a necessary and sufficient frequency.

Third Exemplary Embodiment

Herein, a load meter according to a third exemplary embodiment configured by modifying a part of the configuration of load meter 200 in the first exemplary embodiment will be described as one aspect of the present disclosure.

Figure 11:
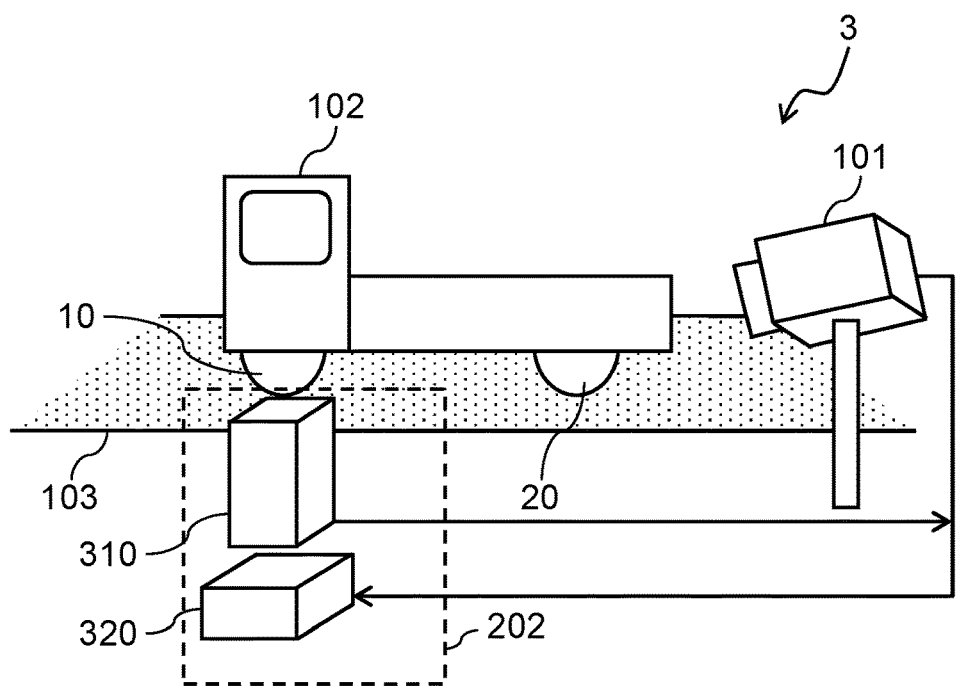
FIG. 11 is a view schematically illustrating one example of a state in which an axle load is measured according to a third exemplary embodiment.

FIG. 11 is a view schematically illustrating one example of a state in which load meter 202 according to the third exemplary embodiment measures an axle load of vehicle 102. As illustrated in FIG. 11, load measuring system 3 according to the third exemplary embodiment includes load meter 202 and imaging device 101. Load meter 202 includes information processor 320 and projector 310 for projecting patterned light onto road 103. Also, imaging device 101 captures an image of road 103 onto which the patterned light has been projected by projector 310.

Hereafter, a detail of this load meter 202 will be described with reference to the drawings, focusing on differences from load meter 200 in the first exemplary embodiment.

[3-1. Configuration]

Figure 12:
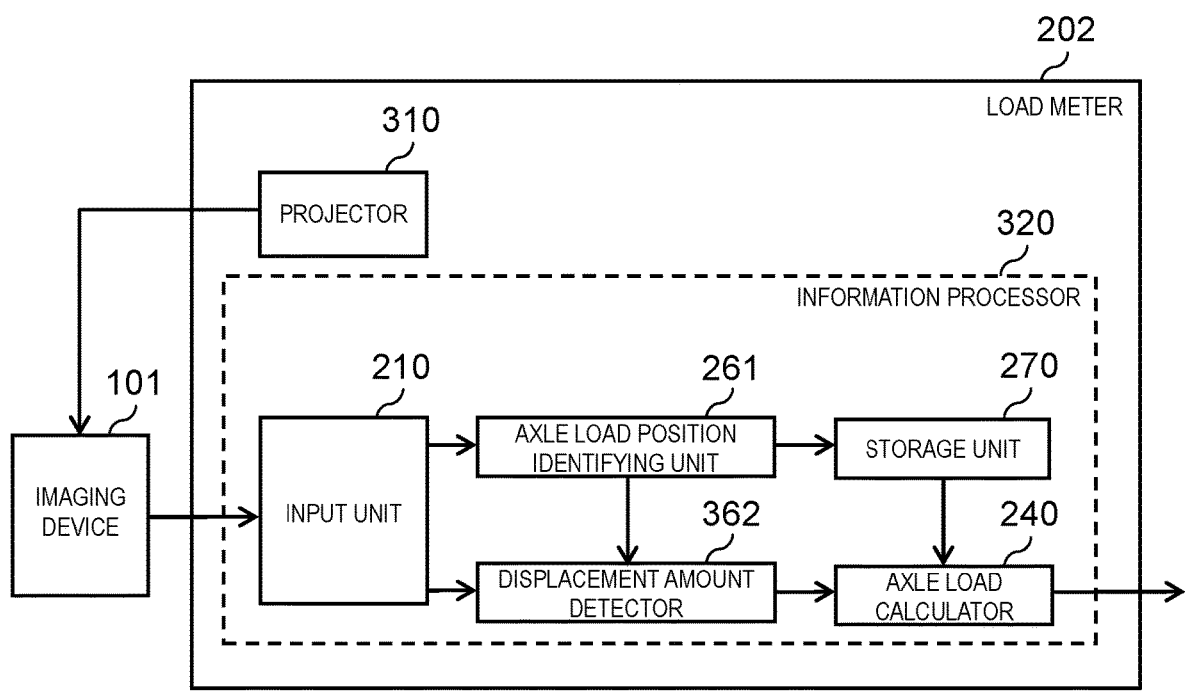
FIG. 12 is a block diagram illustrating a configuration of a load meter according to the third exemplary embodiment.

FIG. 12 is a block diagram illustrating a configuration of load meter 202. As illustrated in FIG. 12, in addition to input unit 210, axle load position identifying unit 261, storage unit 270, and axle load calculator 240 according to the first exemplary embodiment, load meter 202 includes projector 310 and displacement amount detector 362 according to the third exemplary embodiment.

Information processor 320 includes input unit 210, axle load position identifying unit 261, storage unit 270, axle load calculator 240, and displacement amount detector 362.

Projector 310 projects patterned light onto road 103. More specifically, projector 310 projects predetermined patterned light onto an area including at least a part of an area included in a captured image captured by imaging device 101, on a road surface of road 103.

Each of FIGS. 13A to 13E illustrates one example of patterned light projected onto road 103 by projector 310.

Figure 13A:
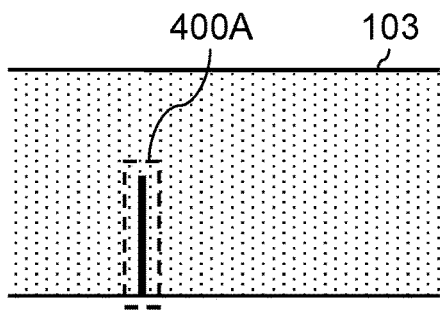
FIG. 13A is a view illustrating one example of patterned light.
Figure 13B:
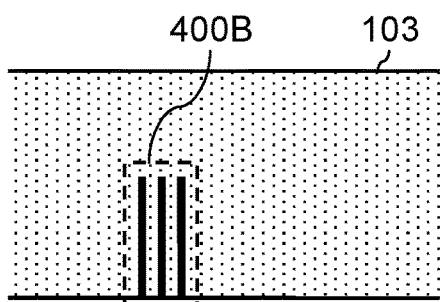
FIG. 13B is a view illustrating one example of patterned light.
Figure 13C:
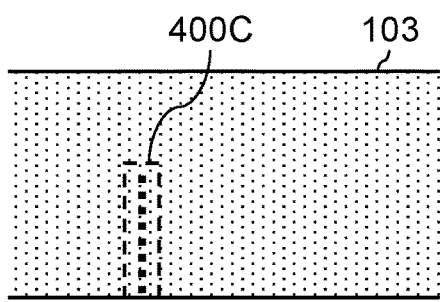
FIG. 13C is a view illustrating one example of patterned light.
Figure 13D:
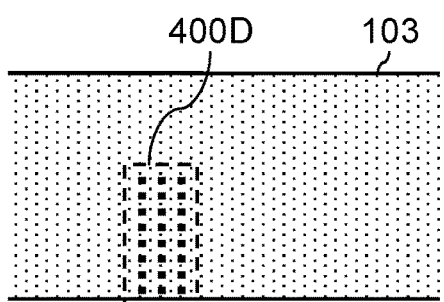
FIG. 13D is a view illustrating one example of patterned light.
Figure 13E:
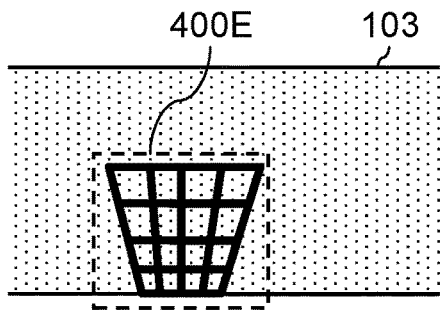
FIG. 13E is a view illustrating one example of patterned light.

FIG. 13A illustrates an example of a case where patterned light 400A has one line segment (line). FIG. 13B illustrates an example of a case where patterned light 400B has a plurality of (herein, three) line segments. FIG. 13C illustrates an example of a case where patterned light 400C has one broken line (dots). FIG. 13D illustrates an example of a case where patterned light 400D has a plurality of (herein, three) broken lines. FIG. 13E illustrates an example of a case where patterned light 400E has a checkered pattern.

Hereinafter, the patterned light projected onto road 103 by projector 310 is described using patterned light 400A illustrated in FIG. 13A. However, a design of the patterned light may be any of patterned light 400A to patterned light 400E illustrated in FIGS. 13A to 13E. Alternatively, the design of the patterned light is not limited to any of these patterned light 400A to patterned light 400E, and any design may be used. However, as described below, it is preferable that the patterned light include a design having a line segment which is not substantially parallel to an imaging direction of a captured image.

FIG. 14 is a view schematically illustrating a relation between a projecting direction of patterned light 400A projected by projector 310 and an imaging direction by imaging device 101.

As illustrated in FIG. 14, projector 310 and imaging device 101 are disposed so that the projecting direction of patterned light 400A and the imaging direction by imaging device 101 are not substantially parallel to each other. Specifically, a certain degree of angle (herein, for example, about 45 degrees) is formed between the projecting direction of patterned light 400A and the imaging direction by imaging device 101.

In this example, patterned light 400A is a line segment extending in the projecting direction. Accordingly, the angle is formed to prevent a direction of this line segment and the imaging direction by imaging device 101 from becoming substantially parallel to each other.

Figure 15A:
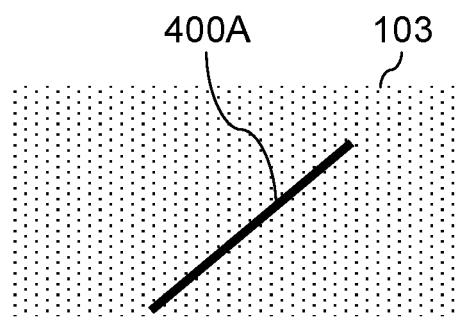
FIG. 15A is a view schematically illustrating the patterned light as seen in the imaging direction.
Figure 15B:
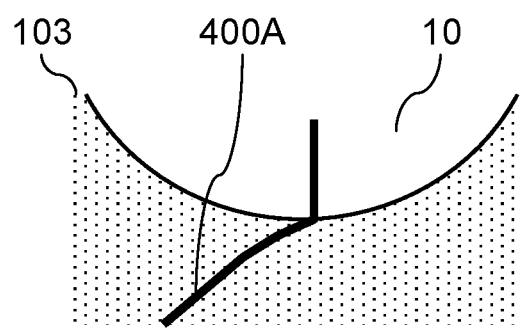
FIG. 15B is a view schematically illustrating the patterned light as seen in the imaging direction.

FIG. 15A is a view schematically illustrating patterned light 400A as seen in the imaging direction by imaging device 101 when an axle load is not applied to road 103. FIG. 15B is a view schematically illustrating patterned light 400A as seen in the imaging direction by imaging device 101 when the axle load is applied to road 103.

As illustrated in FIG. 15B, when the axle load is applied to road 103, displacement occurs in a local area of road 103 to which the axle load is applied (hereinafter also referred to as a "load local area"). Because of this, displacement also occurs in patterned light 400A projected in this load local area.

When the direction of the line segment of patterned light 400A in the load local area and the imaging direction are substantially parallel to each other, it is difficult for the displacement of patterned light 400A to appear as displacement on a captured image.

Therefore, it is desirable that the patterned light projected by projector 310 have a line segment which is not substantially parallel to the imaging direction by imaging device 101.

Returning to FIG. 12 again, and description of projector 310 is continued.

For example, projector 310 may include a laser light oscillator for outputting laser light. In this case, patterned light is realized by the laser light output from the laser light oscillator.

Further, projector 310 may include, for example, a light emitting diode (LED). In this case, patterned light is realized by light output from the LED.

Further, projector 310 may project patterned light by visible light or may project patterned light by near infrared light if, for example, it is an electromagnetic wave in a frequency band that can be captured by imaging device 101.

Further, for example, projector 310 may receive a signal from a sensor for sensing vehicle 102 traveling on road 103, and project patterned light at a timing when vehicle 102 approaches an area onto which patterned light is projected. In this case, projector 310 generates a timing signal indicating a timing of projecting the patterned light, and transmits the timing signal to imaging device 101. Also, imaging device 101 may receive the timing signal, and capture an image at the timing of projecting the patterned light indicated by the timing signal. In the present disclosure, the sensor for sensing vehicle 102 may be substituted for imaging device 101. Further, load measuring system 3 may include the sensor for sensing vehicle 102 apart from imaging device 101.

Further, imaging device 101 may receive the signal from the sensor for sensing vehicle 102 traveling on road 103, and capture a to-be-captured image at the timing when vehicle 102 approaches the area onto which the patterned light is projected. In this case, imaging device 101 transmits a timing signal indicating a timing of capturing the to-be-captured image to projector 310. Also, projector 310 may receive the timing signal, and project patterned light at the timing of capturing the to-be-captured image indicated by the timing signal.

Further, projector 310 and imaging device 101 may receive the signal from the sensor for sensing vehicle 102 traveling on road 103. Projector 310 projects patterned light at the timing when vehicle 102 approaches the area onto which the patterned light is projected. Also, imaging device 101 may capture a to-be-captured image at the timing when vehicle 102 approaches the area onto which the patterned light is projected.

Displacement amount detector 362 detects, by using a captured image received by input unit 210, a displacement amount of patterned light, in the captured image, corresponding to displacement caused on the road when an axle load is applied. Particularly, when an axle load position is input from axle load position identifying unit 261, displacement amount detector 362 detects a displacement amount corresponding to displacement of patterned light at the identified axle load position. By comparing a captured image in which no displacement is caused on the patterned light and a captured image in which displacement is caused on the patterned light, from among a plurality of captured images received by input unit 210, displacement amount detector 362 detects a displacement amount corresponding to the displacement. Displacement amount detector 362 can detect a displacement amount between the captured images by using block matching, a correlation method, or an optical flow. For example, displacement amount detector 362 calculates, as the displacement amount, the number of pixels that indicates a difference in pixel positions corresponding to an identical point on the road between the captured images. Further, the captured image in which no displacement is caused on the patterned light may be a captured image in which the road, onto which the patterned light has been projected, is captured in advance in a state in which the vehicle is not present, a captured image in which an image change amount is less than or equal to a certain level among a plurality of captured images of the road, onto which the patterned light has been projected, captured in succession, or a captured image determined that the vehicle is not present through the image recognition processing.

An operation of load meter 202 having the above-mentioned configuration will be described with reference to the drawings hereafter.

[3-2. Operation]

Load meter 202 performs, as its characteristic operation, a third measurement process.

[3-2-1. Third Measurement Process]

The third measurement process is a process, when a captured image including a vehicle is input to load meter 202, for calculating an axle load of the vehicle, and is a process configured by modifying a part of the first measurement process in the first exemplary embodiment.

Figure 16:
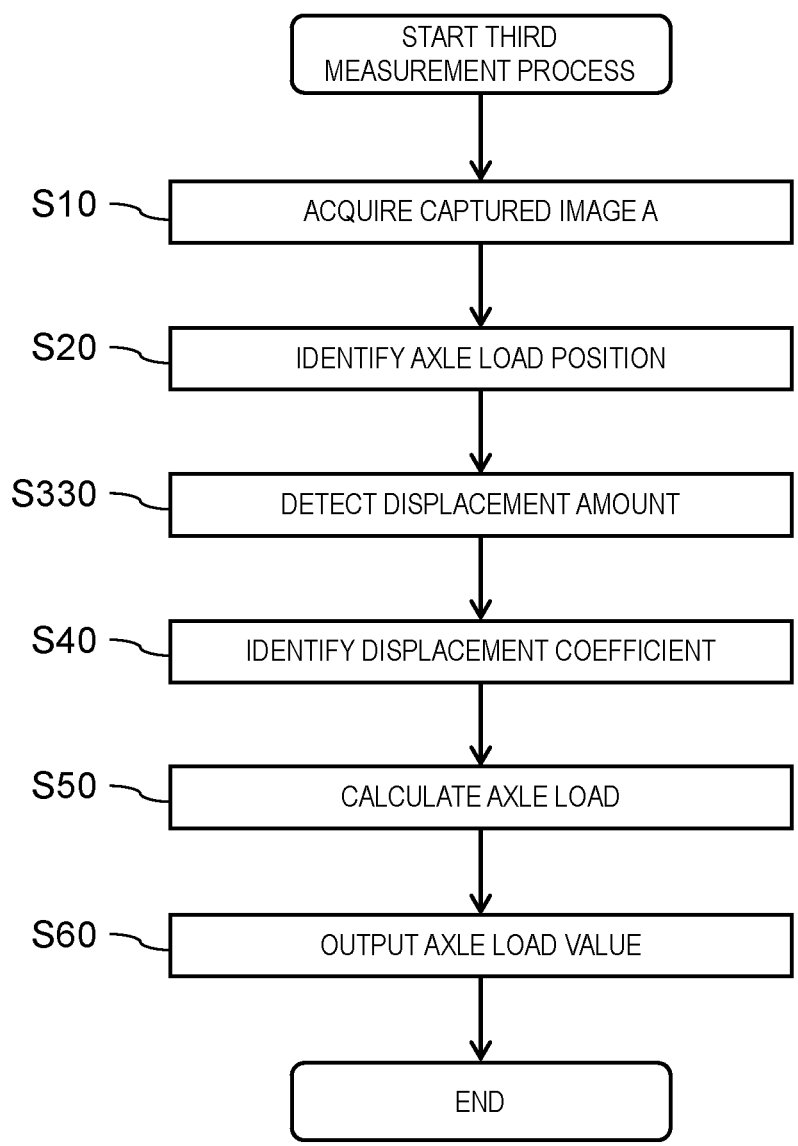
FIG. 16 is a flowchart for describing an operation of a third measurement process.

FIG. 16 is a flowchart for describing the operation of the third measurement process.

As illustrated in FIG. 16, the third measurement process is a process configured by modifying the process in step S30 of the first measurement process in the first exemplary embodiment to a process in step S330. Therefore, the process in step S330 will be mainly described herein.

Upon the identification of the axle load position in the process in step S20, displacement amount detector 362 detects a displacement amount of patterned light corresponding to displacement caused at the identified axle load position on road 103 (step S330). Displacement amount detector 362 detects a displacement amount by using captured image A in which displacement is caused on a patterned light and captured image B in which no displacement is caused on the patterned light. If captured image B has not been acquired by input unit 210 before the axle load position is identified, displacement amount detector 362 waits until captured image B is acquired by input unit 210, and then detects the displacement amount.

Figure 17:
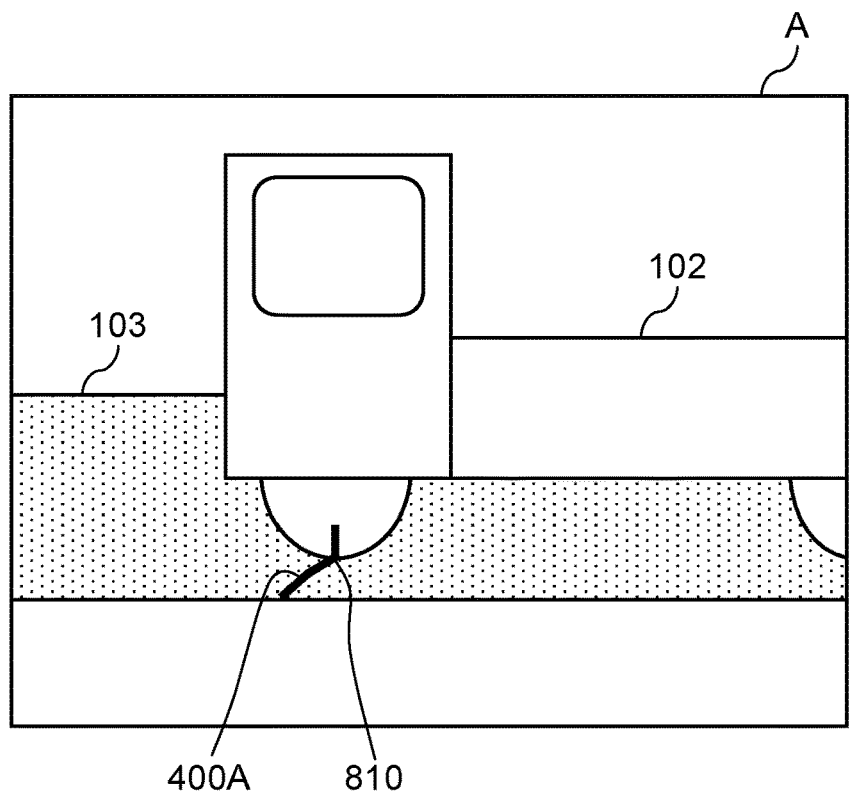
FIG. 17 is a view illustrating one example of captured image A.

FIG. 17 is a view illustrating one example of captured image A acquired. As illustrated in FIG. 17, captured image A includes patterned light 400A projected onto road 103 and vehicle 102 traveling on road 103. Also, this vehicle 102 is in contact with road 103 at lowermost point 810 of a tire of vehicle 102. Further, patterned light 400A is projected onto an area including lowermost point 810 of the tire and a local area on road 103 near lowermost point 810.

Figure 18:
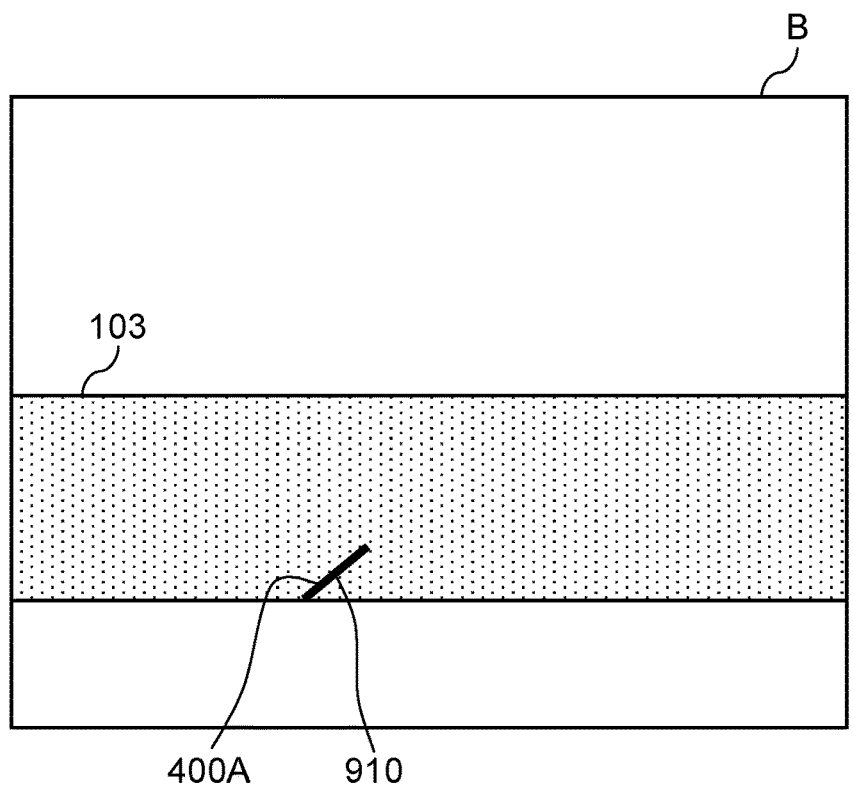
FIG. 18 is a view illustrating one example of captured image B.

FIG. 18 is one example of captured image B acquired. As illustrated in FIG. 18, captured image B does not include a vehicle traveling on road 103, while including patterned light 400A projected onto road 103.

Road 103 is imaged from an identical point of view (that is, a point of view of imaging device 101) in captured image A and captured image B. Area 910 on road 103 in captured image B is an area identical to the area on road 103, which corresponds to lowermost point 810 of the tire, in captured image A.

Displacement amount detector 362 detects a displacement amount of patterned light caused between an area on road 103, which corresponds to lowermost point 810, in captured image A, and area 910 in captured image B.

After the process in step S330 is ended, the third measurement process proceeds to a process in subsequent step S40.

[3-3. Effects Etc.]

As described above, load meter 202 irradiates road 103 with patterned light. Accordingly, on road 103 in which load meter 202 is installed, even if brightness of reflected light from a road surface under natural light is flat, a difference of elevation is created on the brightness of the reflected light from the road surface by the patterned light irradiated. Generally, a displacement amount in a captured image whose brightness having a difference of elevation is detected more precisely than a displacement amount in a captured image having flat brightness.

As a result, load meter 202 can measure an axle load of a vehicle still more precisely than a type of load meter that does not irradiate road 103 with patterned light.

Further, as described above, load meter 202 measures an axle load of a vehicle by utilizing reflected light from the road surface by the patterned light irradiated.

As a result, load meter 202 can measure the axle load of the vehicle even under an environment where a quantity of natural light is absolutely small, such as at night, in the early morning, in the evening, or in bad weather.

Other Exemplary Embodiments

As described above, the first, second, and third exemplary embodiments have been described as an illustration of the technique disclosed in the present application. However, the technique in the present disclosure is not limited to those, and can be also applied to exemplary embodiments in which changes, replacements, additions, omissions, or the like are made as appropriate.

(1) The present disclosure has been stated that load meter 200 is an example of the configuration provided with input unit 210 receiving an input of a captured image of road 103 captured by imaging device 101. However, if load meter 200 can acquire the captured image, load meter 200 is not necessarily provided with input unit 210. For example, load meter 200 may include an imaging unit for generating a captured image, instead of including input unit 210. Further, the captured image used by axle load position identifying unit 261 may be a captured image captured by the imaging unit. This configuration eliminates a need of the external imaging device.

(2) The present disclosure has been stated that load meter 200 is an example of the configuration implemented in such a way that a microprocessor in a computer provided with the microprocessor and a memory executes a program stored in the memory. However, if load meter 200 has a function equivalent to the function in the above-described implementation example, load meter 200 is not necessarily limited to the configuration example implemented according to the above-described implementation example. For example, load meter 200 may be an example of the configuration in which a part of or all of components constituting load meter 200 are implemented by a dedicated circuit.

(3) The present disclosure has been stated that load meter 200 is an example of the configuration for recognizing a tire of a vehicle by an image processing and identifying an area on road 103 corresponding to the lowermost point of the tire as an axle load position. However, the method for identifying the axle load position is not necessarily limited to the above-mentioned method. For example, load meter 200 may identify a position where a displacement amount locally becomes the maximum as the axle load position.

(4) In the present disclosure, axle identifying unit 220 (one example of a vehicle type recognition unit) may recognize a vehicle type from the captured image, and calibrator 250 may selectively generate a histogram for a specific vehicle type. A shape characteristic of the histogram can be easily obtained by selecting the vehicle type. Accordingly, the calibration precision improves.

(5) In the present disclosure, detector 260 may calculate reliability of the displacement amount from the captured image. Further, calibrator 250 may aggregate the displacement amounts and generate the histogram of the displacement amounts, only when the reliability is higher than a predetermined value. A correlation coefficient, sharpness of distribution of correlation functions, or the like, in case of using a correlation method, can be used as the reliability. The calibration precision is improved by using a highly precise displacement detection result.

(6) In the present disclosure, a captured image may be a monochrome image, a color image, or a multispectral image. In addition, light for capturing an image may be ultraviolet rays, near infrared rays, or far infrared rays, besides visible light.

(7) The present disclosure has been described by using an example of the asphalt-paved road surface as the road surface of road 103. However, the road surface of road 103 may be, in addition to the asphalt-paved road surface, a road surface formed of another pavement material, such as concrete. Further, the road surface of road 103 may be a road surface of the above-described paved road surface partially coated with a plate material, a sheet material, a coating material, or the like. To more precisely and significantly obtain displacement based on an image, the road surface of road 103 may be coated with one of the above-mentioned materials, and the coated area may be defined as an area from which displacement is to be detected.

(8) The components (function blocks) in load meters 200, 201, 202 may be individually implemented as a single chip, or a single chip may include a part of or all of the components, by means of a semiconductor device, such as an integrated circuit (IC) or large scale integration (LSI). The method of implementing integrated circuitry is not limited to the LSI, and implementation may be achieved by means of dedicated circuitry or a general-purpose processor. A field programmable gate array (FPGA) for which programming is possible after LSI fabrication, or a reconfigurable processor allowing reconfiguration of connections and settings of circuit cells within an LSI, may also be used. Further, when an integrated circuit implementation technique comes out to replace the LSI as a result of the development of semiconductor technique or another technique derived from the semiconductor technique, the function blocks may be integrated by using that technique. For example, application of biotechnology is possible.

(9) All of or a part of various processes described above may be implemented by a hardware product such as an electronic circuit, or may be implemented by using software. It is to be noted that the process using software is implemented in such a way that the processor in the load meter executes the program stored in the memory. Furthermore, the program may be recorded in a recording medium and may be distributed or circulated. For example, the distributed program is installed in another device including a processor, and the program is executed by the processor. In this way, the device can execute the above-described processes.

(10) The embodiments implemented by any combination of the components and functions of the above-mentioned exemplary embodiments are included in the scope of the present disclosure.

(11) As illustrated in FIG. 14 in the third exemplary embodiment, the present disclosure has been stated that projector 310 is disposed so that the projecting direction by projector 310 is not substantially parallel to the imaging direction of the captured image. However, the present disclosure is not limited to this. If a line segment of a design of patterned light projected by projector 310 is not substantially parallel to the imaging direction of the captured image, projector 310 may be disposed so that the projecting direction by projector 310 is parallel to the imaging direction of the captured image. Specifically, projector 310 may be disposed directly above or directly below imaging device 101.

(12) As illustrated in FIG. 14 in the third exemplary embodiment, the present disclosure has been stated that the patterned light projected by projector 310 includes the design having the line segment which is not substantially parallel to the imaging direction of the captured image. However, the present disclosure is not limited to this. If projector 310 is disposed so that the projecting direction of projector 310 is not substantially parallel to the imaging direction of the captured image, the line segment of the design of the patterned light may be parallel to the imaging direction of the captured image.

INDUSTRIAL APPLICABILITY

The load meter according to the present disclosure is widely applicable to a load meter for measuring a load.

REFERENCE MARKS IN THE DRAWINGS 1, 2, 3: load measuring system
100: load sensor
101: imaging device
102: vehicle
103: road
200, 201, 202: load meter
210, 211: input unit
220, 221: axle identifying unit
230, 231: speed calculator
240, 241: axle load calculator (load calculator)
250, 251: calibrator
260, 263: detector
261: axle load position identifying unit
262, 362: displacement amount detector (detector)
270: storage unit
280: notification unit
300, 301: calibration device
310: projector

The invention claimed is:
1. A load meter comprising:
a projector configured to project patterned light onto a road;
a detector configured to detect, by using a captured image obtained by capturing an area having the patterned light projected onto the road and a vehicle present in the area, a displacement amount of the patterned light in the captured image, the displacement amount corresponding to displacement caused on the road by application of a load of the vehicle;

a storage unit configured to store information indicating a relation between the load and the displacement amount; and a load calculator configured to calculate the load based on the displacement amount and the information.

2. The load meter according to claim 1, wherein the patterned light includes a design having a line segment that is not substantially parallel to an imaging direction of the captured image.

3. The load meter according to claim 1, wherein the projector is disposed so that a projecting direction by the projector is not substantially parallel to an imaging direction of the captured image.

4. The load meter according to claim 1, wherein
the projector generates a timing signal indicating a timing of projecting the patterned light, and
the captured image is an image captured at the timing indicated by the timing signal.

5. The load meter according to claim 1, wherein based on a signal from a sensor for detecting the vehicle traveling on the road, the projector projects the patterned light, and the captured image is captured.

6. The load meter according to claim 1, further comprising a calibrator configured to:
generate a histogram of a plurality of the displacement amounts by aggregating the displacement amounts detected by the detector, and
update a displacement coefficient for calculating the load of the vehicle based on a shape of the histogram.

7. The load meter according to claim 6, wherein the load of the vehicle is an axle load of the vehicle.

8. The load meter according to claim 6, further comprising an axle identifying unit configured to identify an axle number of an axle of the vehicle,
wherein the calibrator generates the histogram for each axle number identified by the axle identifying unit, and updates the displacement coefficient based on the shape of the histogram.

9. The load meter according to claim 8, wherein
the axle identifying unit identifies a first axle serving as a forefront axle of the vehicle, and
the calibrator updates the displacement coefficient based only on the shape of the histogram corresponding to the first axle.

10. The load meter according to claim 6, further comprising a speed calculator configured to calculate a speed of the vehicle,
wherein the calibrator generates the histogram for each speed calculated by the speed calculator, and updates the displacement coefficient based on the shape of the histogram.

11. The load meter according to claim 6, further comprising a vehicle type recognizer configured to recognize a type of the vehicle,
wherein the calibrator generates the histogram for each type recognized by the vehicle type recognizer, and updates the displacement coefficient based on the shape of the histogram.

12. The load meter according to claim 6, wherein the detector calculates reliability of the displacement amount, and
the calibrator aggregates the displacement amounts only when the reliability is higher than a predetermined value.

13. The load meter according to claim 6, wherein the calibrator updates the displacement coefficient based only on the shape of the histogram corresponding to a section that does not include a mode of the histogram.

14. The load meter according to claim 6, wherein the calibrator updates the displacement coefficient only when a predetermined condition is satisfied.

15. The load meter according to claim 6, further comprising a notification unit,
wherein the notification unit performs notification when a difference between a displacement coefficient before being updated by the calibrator and the displacement coefficient updated by the calibrator is a predetermined reference value or more.

16. The load meter according to claim 6, wherein
the storage unit records a histogram of a plurality of the loads, and
the calibrator updates the displacement coefficient based on the shape of the histogram of the displacement amounts and a shape of the histogram of the loads.

17. A load measurement method comprising:
projecting patterned light onto a road;
detecting with a detector configured to detect an image, by using a captured image obtained by capturing an area having the patterned light projected light onto the road and a vehicle present in the area, a displacement amount of the patterned light in the captured image, the displacement amount corresponding to displacement caused on the road by application of a load of the vehicle; and
calculating with a load calculator the load based on the displacement amount and information, stored in a storage unit, indicating a relation between the load and the displacement amount.

18. The load measurement method according to claim 17, further comprising:
generating a histogram of a plurality of the displacement amounts by aggregating the displacement amounts detected in the detecting; and
updating a displacement coefficient for calculating the load of the vehicle based on a shape of the histogram.

* * * * *